(12) United States Patent
Park et al.

(10) Patent No.: US 10,491,275 B2
(45) Date of Patent: Nov. 26, 2019

(54) CODEBOOK BASED SIGNAL TRANSMISSION/RECEPTION METHOD IN MULTI-ANTENNA WIRELESS COMMUNICATION SYSTEM AND APPARATUS THEREFOR

(71) Applicant: LG ELECTRONICS INC., Seoul (KR)

(72) Inventors: Jonghyun Park, Seoul (KR); Huiwon Kim, Seoul (KR); Wonjin Sung, Seoul (KR); Kijun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/056,262

(22) Filed: Aug. 6, 2018

(65) Prior Publication Data

US 2019/0044589 A1     Feb. 7, 2019

Related U.S. Application Data

(60) Provisional application No. 62/541,792, filed on Aug. 7, 2017.

(51) Int. Cl.
*H04B 7/04* (2017.01)
*H04B 7/0456* (2017.01)
*H04B 7/0408* (2017.01)
*H04B 7/06* (2006.01)

(52) U.S. Cl.
CPC ......... *H04B 7/0456* (2013.01); *H04B 7/0408* (2013.01); *H04B 7/0626* (2013.01); *H04B 7/0634* (2013.01)

(58) Field of Classification Search
CPC .. H04B 7/0456; H04B 7/0408; H04B 7/0469; H04B 7/0478; H04B 7/0626; H04B 7/0634
USPC .......................................................... 375/262
See application file for complete search history.

(56) References Cited

U.S. PATENT DOCUMENTS

| | | | | |
|---|---|---|---|---|
| 2009/0041150 A1* | 2/2009 | Tsai | ......................... | H04B 1/59 375/267 |
| 2012/0039251 A1* | 2/2012 | Sayana | ................ | H04B 7/0639 370/328 |
| 2013/0265899 A1* | 10/2013 | Sayana | ................. | H04W 24/00 370/252 |

* cited by examiner

*Primary Examiner* — Michael R Neff
(74) *Attorney, Agent, or Firm* — Lee Hong Degerman Kang Waimey

(57) ABSTRACT

A method for transmitting/receiving signals by a UE based on a codebook in a multi-antenna wireless communication system according to an aspect of the present invention includes: receiving a channel state information reference signal (CSI-RS) from a base station through multiple antenna ports; and reporting channel state information to the base station, wherein the channel state information includes a precoding matrix indicator (PMI) for indicating a specific code vector among a plurality of code vectors included in the codebook, wherein elements included in each code vector included in the codebook are selected from elements of a predetermined circular vector using an azimuth angle of the UE with respect to the base station and an oversampling factor.

12 Claims, 19 Drawing Sheets

(a)

(b)

(a)

(b)

CODEBOOK BASED SIGNAL TRANSMISSION/RECEPTION METHOD IN MULTI-ANTENNA WIRELESS COMMUNICATION SYSTEM AND APPARATUS THEREFOR

CROSS-REFERENCE TO RELATED APPLICATION

Pursuant to 35 U.S.C. § 119(e), this application claims the benefit of U.S. Provisional Patent Application No. 62/541,792, filed on Aug. 7, 2017, the contents of which are hereby incorporated by reference herein in its entirety.

BACKGROUND OF THE INVENTION

Field of the Invention

The present invention relates to a wireless communication system and, more specifically, to a method for transmitting/receiving signals based on a beamforming vector and/or a codebook designed to support various antenna array structures and an apparatus therefor.

Related Art

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY OF THE INVENTION

As the number of antennas, antenna structures and channel environments used in mobile communication systems change, research on codebooks is being conducted. Conventional codebooks specialized for a uniform linear antenna array do not reflect situations in which antenna arrangement varies according to a structure in which an antenna is installed due to characteristics of a small cell. Accordingly, a new beamforming vector and/or a codebook suitable for a nonlinear antenna arrangement/environment (e.g., circular antenna arrangement/environment), which is an antenna arrangement useful in small-cell transmission situations, are proposed in the present description.

It is to be understood that technical objects to be achieved by the present invention are not limited to the aforementioned technical objects and other technical objects which are not mentioned herein will be apparent from the following description to one of ordinary skill in the art to which the present invention pertains.

A method for transmitting and/or receiving signals by a UE based on a codebook in a multi-antenna wireless communication system according to one aspect of the present invention includes: receiving a channel state information reference signal (CSI-RS) from a base station through multiple antenna ports; and reporting channel state information to the base station, wherein the channel state information includes a precoding matrix indicator (PMI) for indicating a specific code vector among a plurality of code vectors included in the codebook, wherein elements of each code vector included in the codebook are selected from elements of a predetermined circular vector using an azimuth angle of the UE for the base station and an oversampling factor.

In the method according to an embodiment of the present description, the predetermined circular vector may be generated based on a vector for a difference between the azimuth angle of the UE for the base station and an azimuth angle of each antenna element. Here, a length of the predetermined circular vector may be determined by a product of the number of antenna elements for transmission and/or reception of the signal and the oversampling factor. Further, the elements of the predetermined circular vector may be configured by circulating values from 0 to a value corresponding to half of the length of the predetermined circular vector.

In addition, the first index of the starting code vector of the codebook may be determined based on a specific index of an element corresponding to the azimuth angle of the UE for the base station among the elements of the predetermined circular vector, an index spacing between code vectors and the number of code vectors included in the codebook. Here, the specific index may be determined by the following equation.

$$k = N - \left[\frac{N}{2\pi}\Phi\right] \quad \text{[Equation]}$$

wherein N represents the length of the predetermined circular vector [.] represents a round function and $\Phi$ represents the azimuth angle of the UE with respect to the base station.

Further, the codebook may be defined by the following equation.

$$W = [v_p \ v_{p+q} \ v_{p+2q} \ \cdots \ v_{p+(Q-1)q}] \quad \text{[Equation]}$$

$$= \frac{1}{\sqrt{M}} \begin{bmatrix} v'_p & v'_{p+q} & v'_{p+2q} & \cdots & v'_{p+(Q-1)q} \\ v'_{p+O} & v'_{p+q+O} & v'_{p+2q+O} & \cdots & v'_{p+(Q-q)q+O} \\ v'_{p+2O} & v'_{p+q+2O} & v'_{p+2q+2O} & \cdots & v'_{p+(Q-1)q+2O} \\ \vdots & \vdots & \vdots & \ddots & \vdots \\ v'_{p+(M-1)O} & v'_{p+q+(M-1)O} & v'_{p+2q+(M-1)O} & \cdots & v'_{p+(Q-1)q+(M-1)O} \end{bmatrix}$$

wherein W indicates the codebook, p indicates the specific index, q represents the index spacing between code vectors, Q represents the number of code vectors included in the codebook, O represents the oversampling factor and M represents the number of antenna elements.

Further, in the method according to an embodiment of the present description, when the UE is instructed by the base station to report channel state information for a specific number of beams, elements other than the specific number of elements may be set to 0 in each code vector.

A UE transmitting channel station information (CSI) in a wireless communication system according to an embodiment of the present description includes: a radio frequency (RF) unit for transmitting and/or receiving radio signals; and a processor for controlling the RF unit, wherein the processor is configured: to receive a channel state information reference signal (CSI-RS) from a base station through multiple antenna ports; and to report channel state information to the base station, wherein the channel state information includes a precoding matrix indicator (PMI) for indicating a specific code vector among a plurality of code vectors included in the codebook, wherein elements of each code vector included in the codebook are selected from elements of a predetermined circular vector using an azimuth angle of the UE for the base station and an oversampling factor.

Further, in the UE according to an embodiment of the present description, the predetermined circular vector may be generated based on a vector for a difference between the azimuth angle of the UE for the base station and an azimuth angle of each antenna element. Here, a length of the predetermined circular vector may be determined by a product of the number of antenna elements for transmission and reception of the signal and the oversampling factor. Further, the elements of the predetermined circular vector may be configured by circulating values from 0 to a value corresponding to half of the length of the predetermined circular vector.

Further, in the UE, the first index of the starting code vector of the codebook may be determined based on a specific index of an element corresponding to the azimuth angle of the UE for the base station among the elements of the predetermined circular vector, an index spacing between code vectors and the number of code vectors included in the codebook. Further, when the UE is instructed by the base station to report channel state information for a specific number of beams, elements other than the specific number of elements may be set to 0 in each code vector.

BRIEF DESCRIPTION OF THE DRAWINGS

The accompanying drawings, which are included to provide a further understanding of the invention, illustrate embodiments of the invention and together with the description serve to explain the principle of the invention.

DESCRIPTION OF EXEMPLARY EMBODIMENTS

Figure 1:
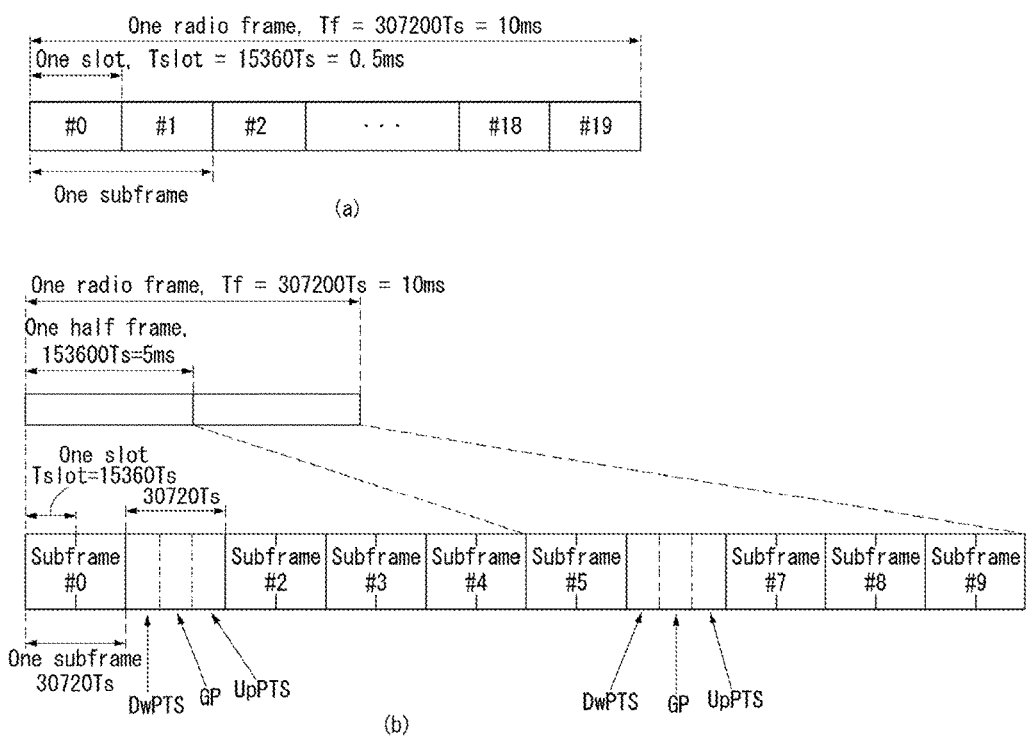
FIG. 1 illustrates a radio frame structure in a wireless communication system to which the present invention is applicable.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a UE node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_S$ | 2192 · $T_S$ | 2560 · $T_S$ | 7680 · $T_S$ | 2192 · $T_S$ | 2560 · $T_S$ |
| 1 | 19760 · $T_S$ | | | 20480 · $T_S$ | | |
| 2 | 21952 · $T_S$ | | | 23040 · $T_S$ | | |
| 3 | 24144 · $T_S$ | | | 25600 · $T_S$ | | |
| 4 | 26336 · $T_S$ | | | 7680 · $T_S$ | 4384 · $T_S$ | 5120 · $T_S$ |
| 5 | 6592 · $T_S$ | 4384 · $T_S$ | 5120 · $T_S$ | 20480 · $T_S$ | | |
| 6 | 19760 · $T_S$ | | | 23040 · $T_S$ | | |
| 7 | 21952 · $T_S$ | | | — | — | — |
| 8 | 24144 · $T_S$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
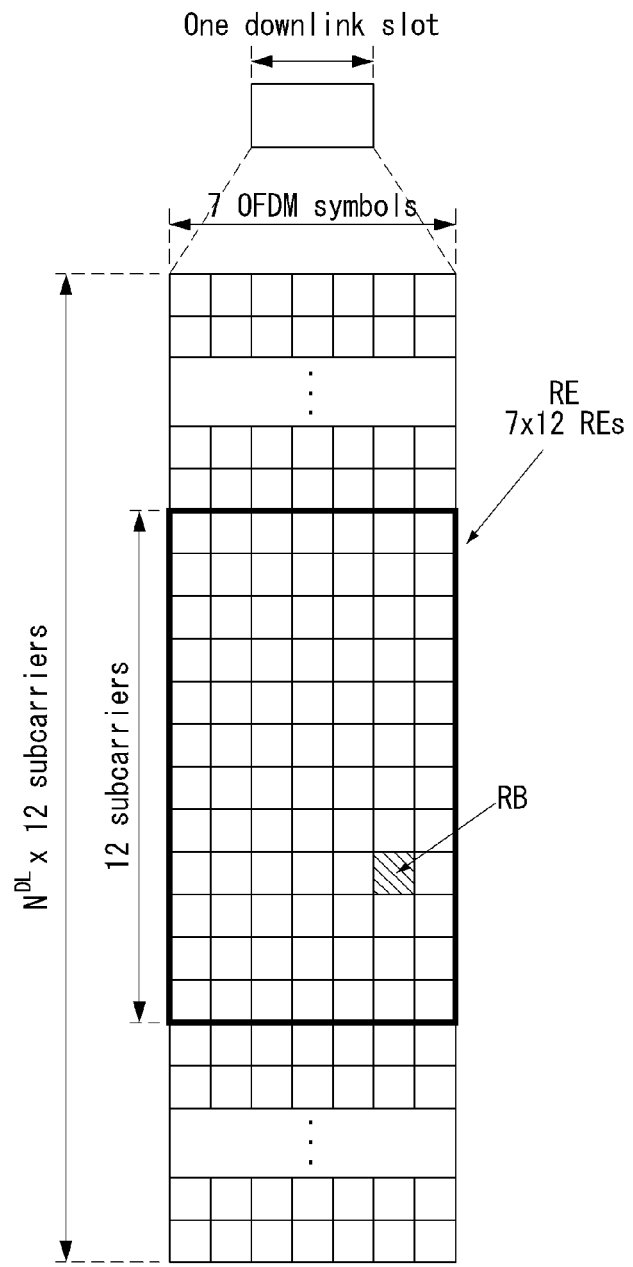
FIG. 2 illustrates a resource grid for a downlink slot in a wireless communication system to which the present invention is applicable.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

Figure 3:
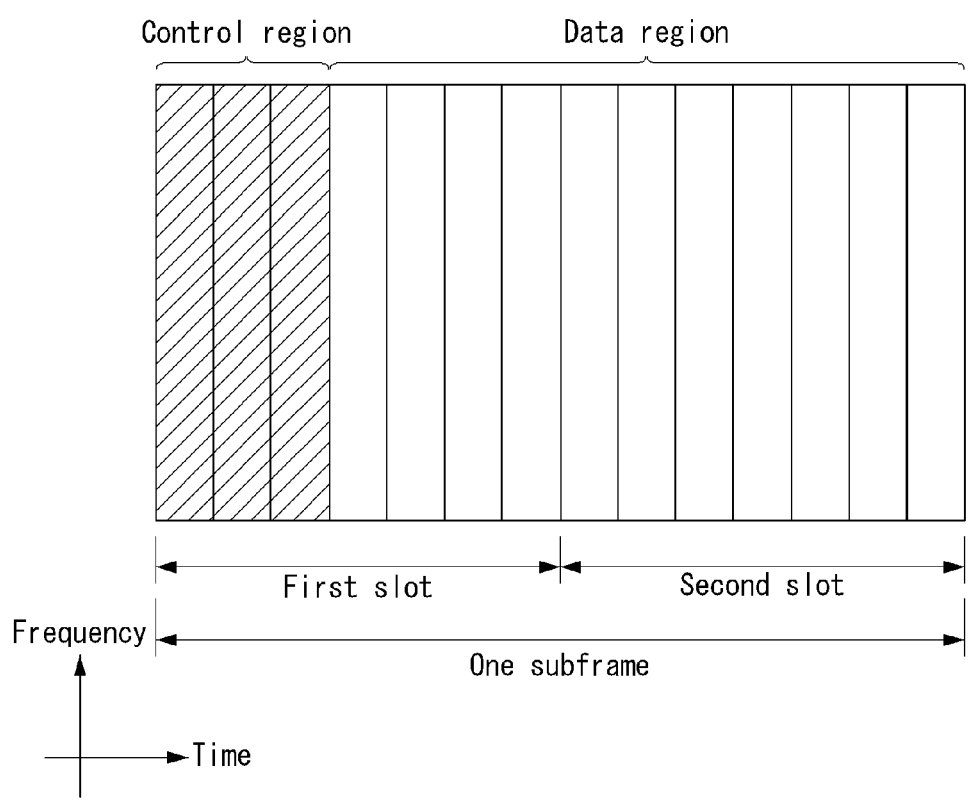
FIG. 3 illustrates a downlink subframe structure in a wireless communication system to which the present invention is applicable.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

Figure 4:
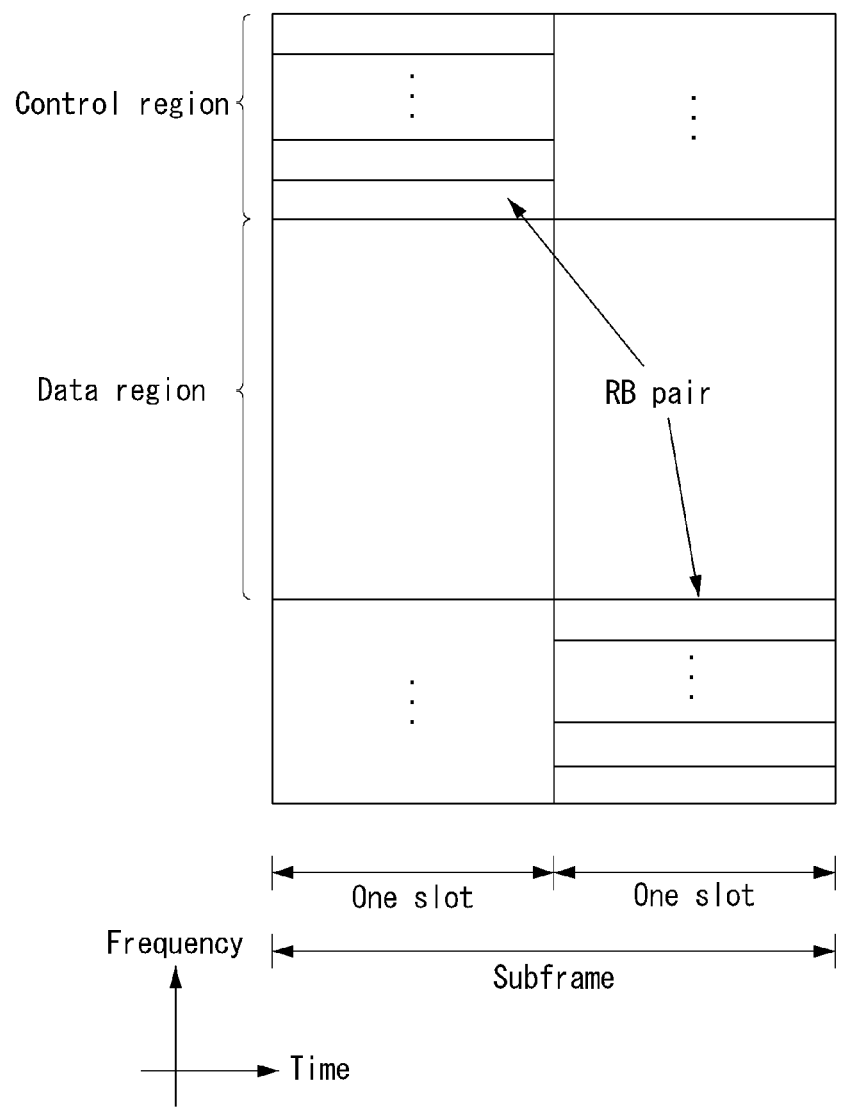
FIG. 4 illustrates an uplink subframe structure in a wireless communication system to which the present invention is applicable.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
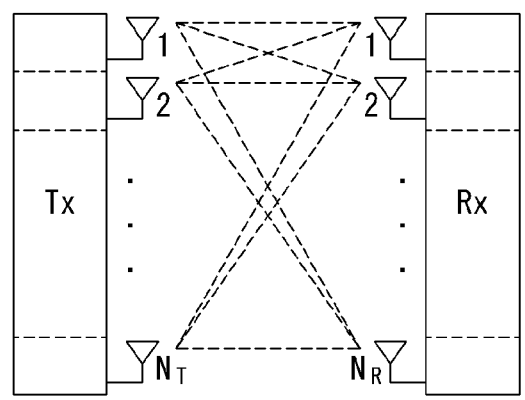
FIG. 5 illustrates a configuration of a normal MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$S = [s_1, s_2, \Lambda, s_{N_T}]^T \quad \text{[Equation 2]}$$

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s}=[\hat{s}_1,\hat{s}_2,\Lambda,\hat{s}_{N_T}]^T=[P_1 s_1,P_2 s_2,\Lambda,P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

[Equation 5]

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & M \\ w_{i1} & w_{i2} & \Lambda & w_{iN_T} \\ M & & O & M \\ w_{N_T 1} & w_{N_T 2} & \Lambda & w_{N_T N_T} \end{bmatrix} \begin{bmatrix} \hat{s}_1 \\ \hat{s}_2 \\ M \\ \hat{s}_j \\ M \\ \hat{s}_{N_t} \end{bmatrix} = W\hat{s} = WPs$$

In this case, w_ij represents weight between the i-th transmission antenna and the j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y=[y_1,y_2,\Lambda,y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
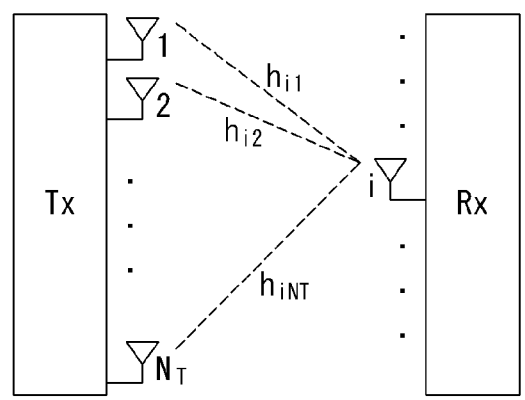
FIG. 6 illustrates channels from multiple transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T=[h_{i1},h_{i2},\Lambda,h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ M \\ h_i^T \\ M \\ h_{N_R}^T \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n=[n_1,n_2,\Lambda,n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

[Equation 10]

$$y = \begin{bmatrix} y_1 \\ y_2 \\ M \\ y_i \\ M \\ y_{N_R} \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix} \begin{bmatrix} x_1 \\ x_2 \\ M \\ x_j \\ M \\ x_{N_T} \end{bmatrix} + \begin{bmatrix} n_1 \\ n_2 \\ M \\ n_i \\ M \\ n_{N_R} \end{bmatrix} = Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Massive MIMO

A MIMO system having a plurality of antennas may be referred to as a massive MIMO system, and has been attracting attention as a means for improving spectral efficiency, energy efficiency, and processing complexity.

In recent 3GPP, a discussion about a massive MIMO system has begun to meet the requirements of spectral efficiency of a future mobile communication system. The massive MIMO is also referred to as a Full-Dimension MIMO (FD-MIMO).

In a wireless communication system after LTE release (Rel: release)-12, the introduction of an Active Antenna System (AAS) is being considered.

Unlike existing passive antenna systems in which antennas and amplifiers capable of adjusting the phase and magnitude of the signals are separate, the AAS is a system in which each antenna is configured to include active elements such as amplifiers.

The AAS does not require separate cable, connector, or other hardware for connecting the amplifier and antenna according to the use of the active antenna, and thus has high efficiency in terms of energy and operational costs. In particular, since the AAS supports an electronic beam control method for each antenna, the AAS enables an advanced MIMO technology such as forming a sophisticated beam pattern considering a beam direction and a beam width, or forming a three-dimensional beam pattern.

With the introduction of advanced antenna systems such as AAS, large-scale MIMO structures with multiple input/output antennas and multi-dimensional antenna structures are also being considered. For example, when a two-dimensional (2D) antenna array is formed unlike an existing linear antenna array, a three-dimensional beam pattern may be formed by the active antenna of the AAS.

Figure 7:
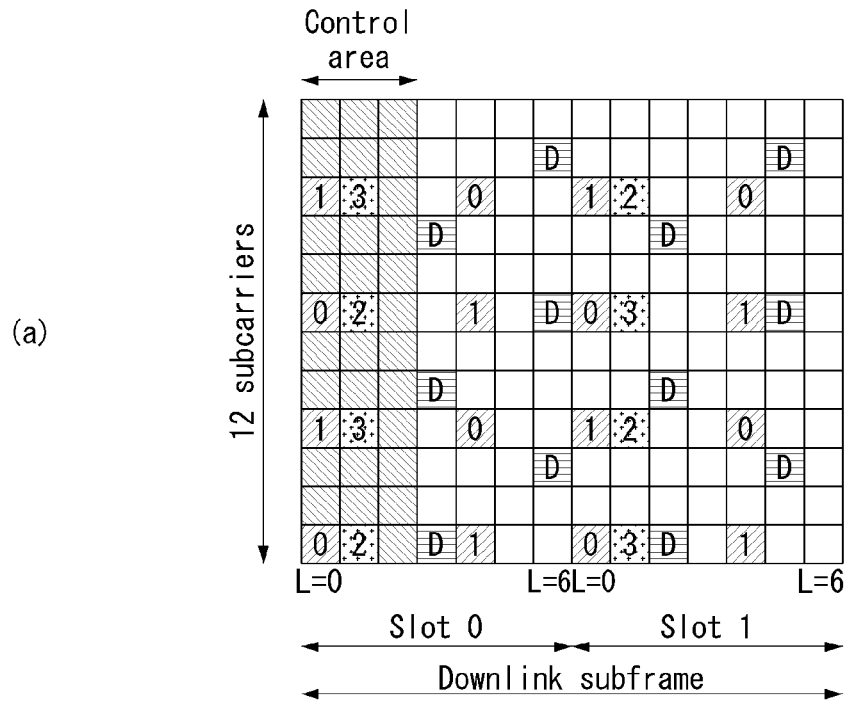
FIG. 7 illustrates a 2-dimensional active antenna system having 64 antenna elements in a wireless communication system to which the present invention is applicable.
Figure 7:
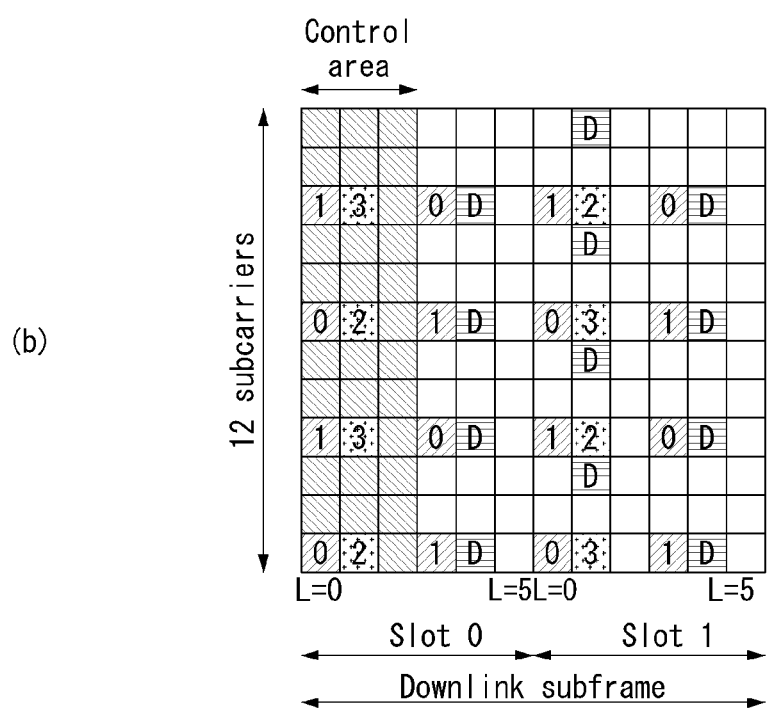

FIG. 7 illustrates a two-dimensional active antenna system having 64 antenna elements in a wireless communication system to which the present invention may be applied.

FIG. 7 illustrates a typical two-dimensional (2D) antenna array, and a case where $N\_t = N\_v \cdot N\_h$ antennas have a square shape as shown in FIG. 7 may be considered. Here, $N\_h$ represents the number of antenna rows in the horizontal direction, and $N\_v$ represents the number of antenna columns in the vertical direction.

When using such a 2D antenna array, radio waves can be controlled both vertically (elevation) and horizontally (azimuth) so as to control a transmission beam in a three-dimensional space. This type of wavelength control mechanism may be referred to as three-dimensional beamforming.

Figure 8:
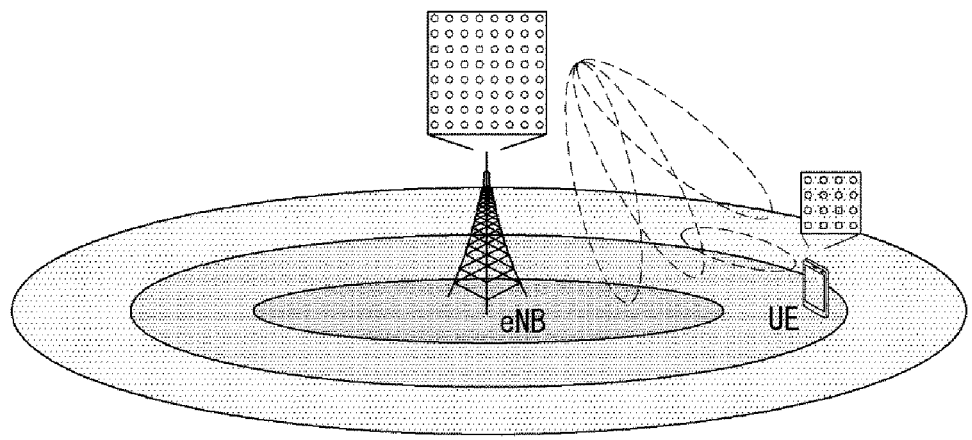
FIG. 8 illustrates a system in which a base station or a UE has a plurality of transmission/reception antennas capable of performing AAS based 3-dimensional (3D) beamforming in a wireless communication system to which the present invention is applicable.

FIG. 8 illustrates a system in which a base station or a UE has a plurality of transmission/reception antennas capable of AAS-based 3D (3-Dimension) beamforming in a wireless communication system to which the present invention may be applied.

FIG. 8 illustrates a 3D MIMO system using a two-dimensional antenna array (i.e., 2D-AAS), which is schematization of the above-described example.

When the three-dimensional beam pattern is utilized from the viewpoint of the transmission antenna, it is possible to perform quasi-static or dynamic beam forming in the vertical direction as well as the horizontal direction of the beam, and applications such as vertical sector formation may be considered.

Also, from the viewpoint of the reception antenna, when a reception beam is formed using large-scale reception antennas, a signal power increasing effect according to an antenna array gain may be expected. Accordingly, in the case of uplink, the base station may receive a signal transmitted from the UE through a plurality of antennas. In this case, there is an advantage that the UE can set its own transmission power to be very low in consideration of the gain of the large-scale reception antennas in order to reduce interference.

Figure 9:
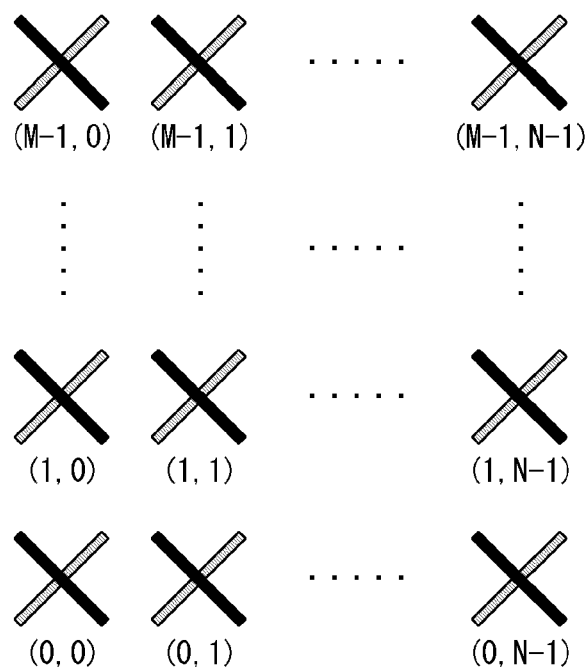
FIG. 9 illustrates a 2D antenna system having cross polarization in a wireless communication system to which the present invention is applicable.

FIG. 9 illustrates a two-dimensional antenna system with cross polarization in a wireless communication system to which the present invention may be applied.

In the case of a 2D planar antenna array model considering polarization, the 2D planar antenna array model may be schematized as shown in FIG. 9.

Unlike an existing MIMO system according to passive antennas, the system based on active antennas can dynamically adjust the gain of the antenna element by applying weights to active elements (e.g., amplifiers) attached to (or included in) each antenna element. Since the radiation pattern depends on the antenna arrangement such as the number of antenna elements, antenna spacing, etc., the antenna system may be modeled at the antenna element level.

An antenna array model like the example of FIG. 9 may be represented by (M, N, P), which correspond to parameters characterizing the antenna array structure.

M represents the number of antenna elements (i.e., the number of antenna elements having a slant of +45 degrees in each column or the number of antenna elements having a slant of −45 degrees in the column) having the same polarization in each column (i.e., in the vertical direction).

N represents the number of columns in the horizontal direction (i.e., the number of antenna elements in the horizontal direction).

P represents the number of dimensions of polarization. As shown in FIG. 9, P=2 in the case of cross polarization, and P=1 in the case of co-polarization.

An antenna port may be mapped to a physical antenna element. The antenna port may be defined by a reference signal associated with the corresponding antenna port. For example, in an LTE system, the antenna port 0 may be associated with a Cell-specific Reference Signal (CRS), and the antenna port 6 may be associated with a Positioning Reference Signal (PRS).

For example, the antenna port and the physical antenna element may be mapped one-to-one. This may correspond to the case where a single cross polarization antenna element is used for downlink MIMO or downlink transmission diversity. For example, the antenna port 0 may be mapped to one physical antenna element while the antenna port 1 may be mapped to another physical antenna element. In this case, there are two downlink transmissions for a UE. One is associated with the reference signal for the antenna port 0, and the other is associated with the reference signal for the antenna port 1.

In another example, a single antenna port may be mapped to multiple physical antenna elements. This may be a case of being used for beamforming. Beamforming may use multiple physical antenna elements to direct downlink transmission to a particular UE. This may be achieved by using an antenna array which generally includes multiple columns of multiple cross polarization antenna elements. In this case, for the UE, there is a single downlink transmission occurring from a single antenna port. One is associated with CRS for the antenna port 0, and the other is associated with CRS for the antenna port 1.

That is, the antenna port indicates downlink transmission at the UE, not the actual downlink transmission transmitted from the physical antenna element at the base station.

In another example, a plurality of antenna ports are used for downlink transmission, but each antenna port may be mapped to multiple physical antenna elements. This may correspond to a case where the antenna array is used for downlink MIMO or downlink diversity. For example, the antenna ports 0 and 1 may each be mapped to multiple physical antenna elements. In this case, there are two downlink transmissions for a UE. One is associated with the reference signal for the antenna port 0, and the other is associated with the reference signal for the antenna port 1.

In FD-MIMO, MIMO precoding of the data stream may pass through antenna port virtualization, transceiver unit (TXRU) virtualization, and antenna element pattern.

The antenna port virtualization means that the stream on the antenna port is precoded on the TXRU. The TXRU virtualization means that the TXRU signal is precoded on the antenna element. In the case of the antenna element pattern, a signal radiated from the antenna element may have a directional gain pattern.

In existing transceiver modeling, a static one-to-one mapping between the antenna port and the TXRU is assumed, and the TXRU virtualization effect is combined into a static (TXRU) antenna pattern that includes all of TXRU virtualization and antenna element pattern effects.

The antenna port virtualization may be performed in a frequency-selective manner. In LTE, the antenna port is defined together with a reference signal (or pilot). For example, for precoded data transmission on the antenna port, the DMRS is transmitted in the same bandwidth as the data signal, and all the DMRS and data are precoded by the same precoder (or the same TXRU virtual precoding). For CSI measurement, the CSI-RS is transmitted through multiple antenna ports. For CSI-RS transmission, a precoder that characterizes the mapping between the CSI-RS port and the TXRU such that a UE can estimate a TXRU virtualization precoding matrix for the data precoding vector may be designed with a unique matrix.

The TXRU virtualization method includes discussions of one-dimensional TXRU virtualization (1D TXRU virtualization) and two-dimensional TXRU virtualization (2D TXRU virtualization), which will be described with reference to the following drawings.

Figure 10:
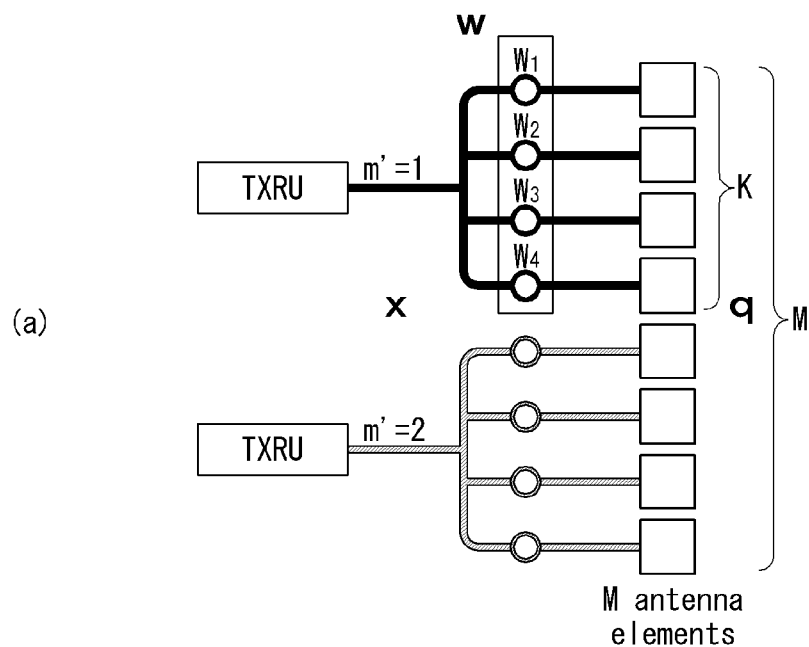
FIG. 10 illustrates a transceiver unit model in a wireless communication system to which the present invention is applicable.
Figure 10:
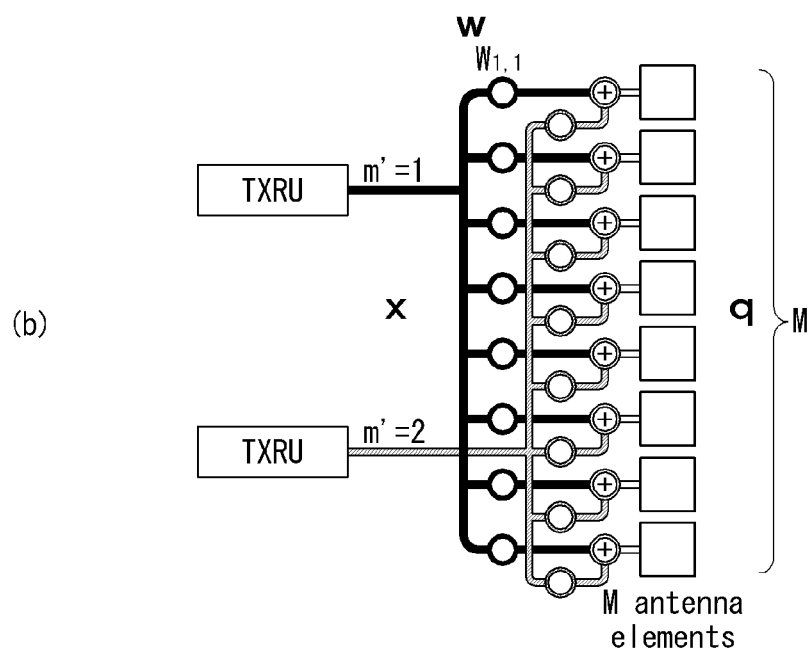

FIG. 10 illustrates a transceiver unit model in a wireless communication system to which the present invention may be applied.

In 1D TXRU virtualization, M_TXRU number of TXRUs are associated with M antenna elements that are configured with a single column antenna array with co-polarization.

In 2D TXRU virtualization, the TXRU model configuration corresponding to the antenna array model configuration (M, N, P) of FIG. 9 may be represented by (M_TXRU, N, P). Here, M_TXRU represents the number of TXRUs existing at the same row of 2D and the same polarization, and M_TXRU≤M is always satisfied. That is, the total number of TXRUs is equal to M_TXRU×N×P.

The TXRU virtualization model is classified into a TXRU virtualization model option-1: a sub-array partition model and a 12-bit sub-array partition model as shown in FIG. 10A, and TXRU virtualization model option-2: full-connection model as shown in FIG. 10B according to the correlation between the antenna element and the TXRU.

Referring to FIG. 10A, in the case of the sub-array partition model, an antenna element is divided into a plurality of antenna element groups, and each TXRU is connected to one of the groups.

Referring to FIG. 10B, in the case of the full-connection model, signals of multiple TXRUs are combined and transmitted to a single antenna element (or an array of antenna elements).

In FIG. 10, q is a transmission signal vector of M co-polarized antenna elements in one column. w is a wideband TXRU virtualization weight vector, and W is a wideband TXRU virtualization weight matrix. x is a signal vector of M_TXRU number of TXRUs.

Here, the mapping between the antenna port and the TXRUs may be one-to-one or one-to-many.

In FIG. 10, the TXRU-to-element mapping between the TXRU and the antenna element is merely an example, and the present invention is not limited thereto. The present invention may also be equally applied to the mapping between the TXRU and the antenna element which can be implemented in other various forms in terms of hardware.

Codebook Design Method for Supporting Various Antenna Array Structures

One of the important directions of mobile communication technology evolution is an increase of the data transmission rate through an increase of the channel capacity. For this, a method of increasing the frequency reuse frequency by utilizing a small cell, and a Multiple-Input Multiple-Output (MIMO) technology using a large number of antennas are currently being developed. An important element technology for MIMO transmission is to perform beamforming through an efficient codebook design that accurately recognizes the channel environment.

Typical codebooks used for MIMO transmission which is used in existing cellular networks are specialized in a uniform linear antenna array environment. In the small cell environment, if the base station type antenna is installed in each cell, the cost increases. Accordingly, in addition to the existing Uniform Linear Array (ULA) and Uniform Rectangular Array (URA), a change of the antenna array form is required in accordance with the shape of a structure in which antennas can be easily installed. For example, the antennas may be installed along the surface of lamps, streetlights, road signs, street trees, etc. In this case, the antenna may be arranged in a cylindrical shape. In this antenna array, since the propagation distance and time are irregular according to the shape of the structure, it is difficult to apply the beam forming method applied to the existing linear antenna array environment, and it is necessary to apply a new beam forming different from the corresponding method.

Particularly, research on a beamforming vector and a codebook suitable for a uniform circular antenna array structure which can be used by being attached to streetlamps, telephone poles and the like, among various arrays which can be considered, needs to be conducted. For example, when a codebook used in a conventional linear antenna array structure is modified and applied to the uniform circular antenna array structure, maximum performance specialized for the uniform circular antenna array may not be obtained. In addition, a method of generating a beamforming vector by reflecting a beam movement difference in a circular antenna array generates a single vector for a specific azimuth angle and thus may not be suitable for the uniform circular antenna array.

Accordingly, the present description proposes a method of generating a correct directional beamforming vector using a geometrical structure of the uniform circular antenna array structure. In addition, the present description proposes a method of defining a tall circuit vector (TCV) which is an entity corresponding to a DFT matrix (e.g., fat matrix) used in a uniform linear antenna array. For example, the TCV may refer to a beamforming vector having an increased length according to multiplication of the number of antenna elements by an oversampling factor.

Using the aforementioned methods, the present description proposes a method of generating a codebook suitable for the uniform circular antenna array structure. Hereinafter, it will be proven that a codebook proposed in the present description has considerably improved performance compared to conventionally used codebooks through evaluation of performance of the proposed codebook. For example, in the case of the codebook proposed in the present description, omnidirectional transmission can be performed irrespective of UE location, distinguished from the conventional 3-sector structure. Accordingly, it is possible to prevent performance deterioration near a cell boundary and increase the number of antenna elements which can be allocated to a UE.

In addition, the present description proposes a method of performing beamforming with a beamforming vector length adjusted and a beamforming execution method which reflects phase changes according to variation in a zenith angle.

As a specific example of the present invention, a configuration method of parameters suitable for a cylindrical antenna is proposed, but it is not limited thereto and may be extended to various antenna shapes.

The "base station" described in the present specification corresponds to a transmission point (TP)/reception point (RP) of a cell, a base station, an eNB, a sector, a Remote Radio Head (RRH), etc., and may be used as a generic term to distinguish component carriers at a specific transmission/reception point. Hereinafter, the proposed method will be described based on the 3GPP LTE system for convenience of explanation. However, the scope of the system to which the proposed method is applied may be extended to other systems other than the 3GPP LTE system.

As described above, the present description proposes a codebook for omnidirectional transmission using the uniform circular antenna array. Parameters required for codebook design are generalized and defined, and then examples of application of the codebook are described. In addition, as described above, the present description defines a TCV (Tall Circular Vector) for the uniform circular antenna array and describes a method of generating a beamforming vector and a codebook through the TCV in stages.

Figure 11:
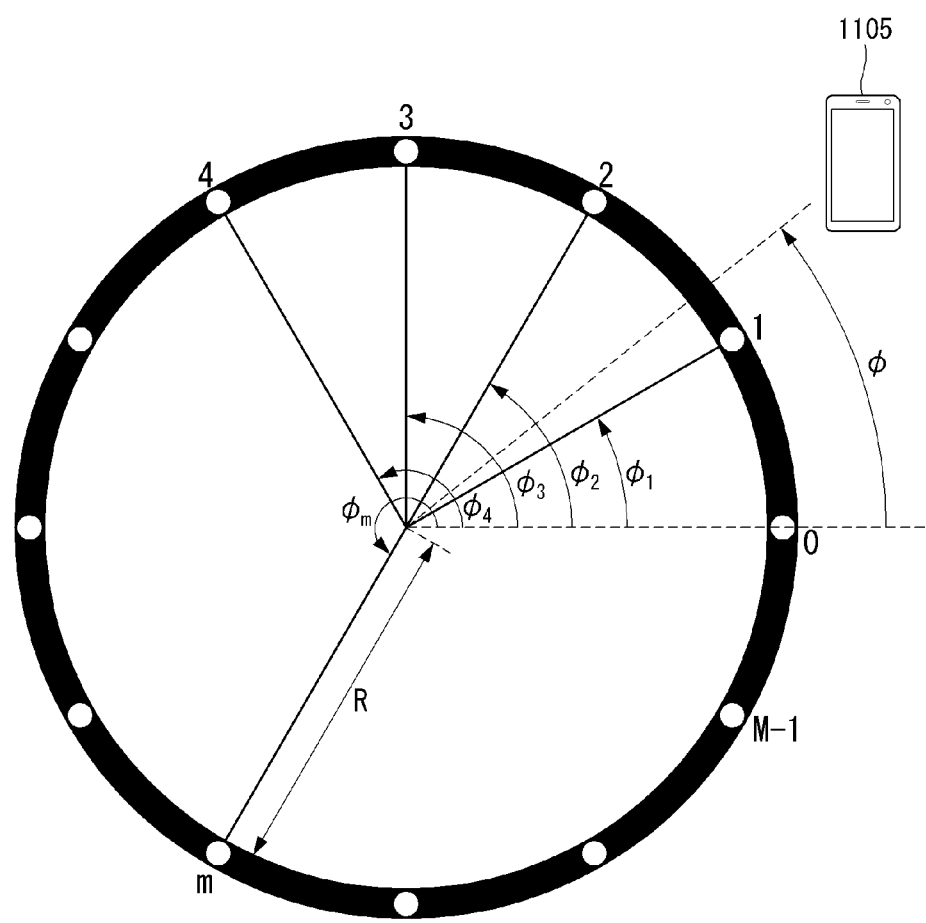
FIG. 11 illustrates an example of a uniform circular antenna array to which a method proposed in the present description is applicable.

FIG. 11 illustrates an example of a uniform circular antenna array to which the method proposed in the present description is applicable. FIG. 11 is for convenience of description and does not limit the scope of the present invention.

In the present description, a uniform circular antenna array may refer to an antenna array in which a plurality of antenna elements is circularly arranged at regular intervals.

For example, M antenna elements may be arranged on a circle having a radius of R at uniform intervals. Here, the azimuth angle $\Phi_m$ of an m-th antenna element may be defined by Equation 12.

$$\Phi_m = 2\pi/M(m=0,1,\ldots,M-1) \quad \text{[Equation 12]}$$

In Equation 12, M indicates the number of antenna elements constituting the uniform circular antenna array.

A propagation distance difference $d_m$ per antenna element may be calculated in the uniform circular antenna array structure according to the azimuth angle $\Phi$ of a UE (or user) 1105. The propagation movement distance difference per element is identical irrespective of the location of the UE and the value thereof may be defined by Equation 13.

$$d_m = R - R\cos(\Phi - \Phi_m), m=0,1,\ldots,M-1 \quad \text{[Equation 13]}$$

In Equation 13, R indicates the radius of the uniform circular antenna array structure and M indicates the number of antenna elements constituting the uniform circular antenna array.

Here, the two terms of Equation 13 can be represented as one using trigonometric formulas as represented by Equation 14.

$$d_m = R - R\cos(\Phi - \Phi_m) = \quad \text{[Equation 14]}$$
$$R\left(1 - \cos\left(\Phi - \frac{2\pi m}{M}\right)\right) = 2R\sin^2\frac{1}{2}\left(\Phi - \frac{2\pi m}{M}\right),$$
$$m = 0, 1, \ldots, M-1$$

In Equation 14, R indicates the radium of the uniform circular antenna array structure, M indicates the number of antenna elements constituting the uniform circular antenna array, $\Phi$ represents the azimuth angle of the UE and $\Phi_m$ represents the azimuth angle of the m-th antenna element.

Equation 14 may be represented in a vector form as expressed by Equation 15.

$$d = 2R\sin^2\frac{1}{2}\phi = [\,d_0 \quad d_1 \quad \ldots \quad d_{M-1}\,]^T = \quad \text{[Equation 15]}$$
$$\left[\,2R\sin^2\frac{1}{2}\Phi \quad 2R\sin^2\frac{1}{2}\left(\Phi - \frac{2\pi}{M}\right) \quad \ldots \quad 2R\sin^2\frac{1}{2}\left(\Phi - \frac{2\pi(M-1)}{M}\right)\,\right]^T$$

In Equation 15, R indicates the radius of the uniform circular antenna array structure, M indicates the number of antenna elements constituting the uniform circular antenna array, $\Phi$ represents the azimuth angle of the UE and $d_m$ represents a propagation movement distance difference per antenna element.

In addition, when the difference between the azimuth angle $\Phi$ of the UE and the azimuth angle of the m-th antenna element is defined as $\Phi_m$, this may be represented by Equation 16

$$\phi_m = \Phi - \frac{2\pi m}{M} \quad \text{[Equation 16]}$$

In Equation 16, $\Phi$ represents the azimuth angle of the UE and M indicates the number of antenna elements constituting the uniform circular antenna array.

The azimuth angle difference of Equation 16 may be represented in a vector form as expressed by Equation 17.

$$\phi = [\phi_0 \ \phi_1 \ \ldots \ \phi_{M-1}]^T = \quad \text{[Equation 17]}$$
$$\left[ \Phi \ \ \Phi - \frac{2\pi}{M} \ \ \ldots \ \ \Phi - \frac{2\pi(M-1)}{M} \right]^T$$

A channel phase difference per antenna element may be calculated using the propagation movement distance difference per antenna element, and the channel phase $\theta_m$ of the m-th element may be represented by Equation 18.

$$\theta_m = 2\pi f_c \tau_m = \frac{2\pi d_m}{\lambda} \quad \text{[Equation 18]}$$
$$= \frac{4\pi R}{\lambda} \sin^2 \frac{1}{2}\left(\Phi - \frac{2\pi m}{M}\right)$$
$$= \kappa \sin^2 \frac{1}{2}\left(\Phi - \frac{2\pi m}{M}\right), \kappa = \frac{4\pi R}{\lambda}$$

In Equation 18, R indicates the radius of the uniform circular antenna array structure, M indicates the number of antenna elements constituting the uniform circular antenna array, $\Phi$ represents the azimuth angle of the UE, $f_c$ represents a center frequency, and $\lambda$ represents the wavelength of the center frequency.

Here, the vector $\theta$ representing the channel phase per antenna element may be represented by Equation 19.

$$\text{[Equation 19]}$$
$$\theta = \kappa \sin^2 \frac{1}{2}\phi = [\theta_0 \ \theta_1 \ \ldots \ \theta_{M-1}]^T$$
$$= \left[ \kappa \sin^2 \frac{1}{2}\Phi \ \ \kappa \sin^2 \frac{1}{2}\left(\Phi - \frac{2\pi}{M}\right) \ \ \ldots \ \ \kappa \sin^2 \frac{1}{2}\left(\Phi - \frac{2\pi(M-1)}{M}\right) \right]^T$$

According to Equations 18 and 19, elements $v_m$ of a beamforming vector in consideration of the geometrical structure of the uniform circular array antenna elements may be represented by Equation 20 and the beamforming vector may be defined as expressed by equation 21.

$$v_m = e^{-j\theta_m} = e^{-j\kappa \sin^2 \frac{1}{2}\phi_m} \quad \text{[Equation 20]}$$

$$v = e^{-j\theta} = e^{-j\kappa \sin^2 \frac{1}{2}\phi} \quad \text{[Equation 21]}$$
$$= [v_0 \ v_1 \ v_2 \ \ldots \ v_{M-1}]^T$$
$$= [e^{-j\theta_0} \ e^{-j\theta_1} \ e^{-j\theta_2} \ \ldots \ e^{-j\theta_{M-1}}]^T$$
$$= \left[ e^{-j\kappa \sin^2 \frac{1}{2}\phi_0} \ e^{-j\kappa \sin^2 \frac{1}{2}\phi_1} \ e^{-j\kappa \sin^2 \frac{1}{2}\phi_2} \ \ldots \ e^{-j\kappa \sin^2 \frac{1}{2}\phi_{M-1}} \right]^T$$

That is, the beamforming vector may be generated (or defined) through a procedure of calculating the difference (i.e., $\Phi_m$) between the azimuth angle of the UE and the azimuth angle of each antenna element and calculating the channel phase per antenna element using the difference.

In addition, the number M of antenna elements may be multiplied by an oversampling factor O to increase the length of the beamforming vector to N. The beamforming vector having a length increased in this manner may be called a TCV (Tall Circular Vector). As described above, a TCV in the uniform circular antenna array may be a new entity corresponding to a DFT matrix used in a conventional uniform linear antenna array. TCV(v') may be defined as represented by Equation 22.

$$\text{[Equation 22]}$$
$$v' = [v'_0 \ v'_1 \ v'_2 \ \ldots \ v'_{N-1}]^T$$
$$= e^{-j\theta'} = [e^{-j\theta'_0} \ e^{-j\theta'_1} \ e^{-j\theta'_2} \ \ldots \ e^{-j\theta'_{N-1}}]^T$$
$$= e^{-j\kappa \sin^2 \frac{1}{2}\phi'}$$
$$= \left[ e^{-j\kappa \sin^2 \frac{1}{2}\phi'_0} \ e^{-j\kappa \sin^2 \frac{1}{2}\phi'_1} \ e^{-j\kappa \sin^2 \frac{1}{2}\phi'_2} \ \ldots \ e^{-j\kappa \sin^2 \frac{1}{2}\phi'_{N-1}} \right]^T$$

In addition, as represented by Equation 22, the lengths of the vector $\phi$ indicating the azimuth angle difference of antenna elements and the vector $\theta$ indicating the channel phase per antenna element may also be increased to N using the oversampling factor O. In this case, newly defined $\phi'$ and $\theta'$ may be represented by Equations 23 and 24.

$$\theta' = [\theta'_0 \ \theta'_1 \ \theta'_2 \ \ldots \ \theta'_{N-1}]^T, \ \theta'_n = \kappa \sin^2 \frac{\phi_n}{2} \quad \text{[Equation 23]}$$

$$\phi' = \quad \text{[Equation 24]}$$
$$[\phi'_0 \ \phi'_1 \ \phi'_2 \ \ldots \ \phi'_{N-1}]^T = \frac{2\pi}{N}[0 \ 1 \ 2 \ \ldots \ N-1]^T$$

Here, $\phi'$ is used to calculate $\theta'$ and is inserted into a sine square function. When the result value of $\theta'$ is observed, a vector $\phi''$ transformed in such a manner that element values increase and then decrease from the halfway point using the property of $$\sin^2 \frac{n\pi}{N} = \sin^2 \frac{(N-n)\pi}{N}$$

may be used. Here, $\phi''$ may be represented by Equation 25.

$$\phi'' = \frac{2\pi}{N}\left[ 0 \ 1 \ 2 \ \ldots \ \frac{N}{2}-1 \ \frac{N}{2} \ \frac{N}{2}-1 \ \ldots \ 2 \ 1 \right]^T \quad \text{[Equation 25]}$$

In the uniform circular antenna array structure, a beamforming vector is determined by the azimuth angle of a UE and N quantized beamforming vectors for UE azimuth angles may be generated. Here, the N vectors may be column vectors constituting a large matrix for a uniform circular antenna array.

Equation 26 represents an example of $\phi$ for forming a large matrix with respect to a uniform circular antenna array when the number M of antenna elements is 12 and the length of the oversampling vector O is 4, that is, N is 48.

[Equation 26]

$$\begin{bmatrix} 0 & 1 & 2 & 3 & 4 & 5 & 6 & 7 & 8 & 9 & 10 & 11 & 12 & 13 & 14 & 15 & 16 & 17 & 18 & 19 & 20 & 21 & 22 & 23 & 24 & 23 & 22 & \cdots & 4 & 3 & 2 & 1 \\ 4 & 5 & 6 & 7 & 8 & 9 & 10 & 11 & 12 & 13 & 14 & 15 & 16 & 17 & 18 & 19 & 20 & 21 & 22 & 23 & 24 & 23 & 22 & 21 & 20 & 19 & 18 & \cdots & 0 & 1 & 2 & 3 \\ 8 & 9 & 10 & 11 & 12 & 13 & 14 & 15 & 16 & 17 & 18 & 19 & 20 & 21 & 22 & 23 & 24 & 23 & 22 & 21 & 20 & 19 & 18 & 17 & 16 & 15 & 14 & \cdots & 4 & 5 & 6 & 7 \\ 12 & 13 & 14 & 15 & 16 & 17 & 18 & 19 & 20 & 21 & 22 & 23 & 24 & 23 & 22 & 21 & 20 & 19 & 18 & 17 & 16 & 15 & 14 & 13 & 12 & 11 & 10 & \cdots & 8 & 9 & 10 & 11 \\ 16 & 17 & 18 & 19 & 20 & 21 & 22 & 23 & 24 & 23 & 22 & 21 & 20 & 19 & 18 & 17 & 16 & 15 & 14 & 13 & 12 & 11 & 10 & 9 & 8 & 7 & 6 & \cdots & 12 & 13 & 14 & 15 \\ 20 & 21 & 22 & 23 & 24 & 23 & 22 & 21 & 20 & 19 & 18 & 17 & 16 & 15 & 14 & 13 & 12 & 11 & 10 & 9 & 8 & 7 & 6 & 5 & 4 & 3 & 2 & \cdots & 16 & 17 & 18 & 19 \\ 24 & 23 & 22 & 21 & 20 & 19 & 18 & 17 & 16 & 15 & 14 & 13 & 12 & 11 & 10 & 9 & 8 & 7 & 6 & 5 & 4 & 3 & 2 & 1 & 0 & 1 & 2 & \cdots & 20 & 21 & 22 & 23 \\ 20 & 19 & 18 & 17 & 16 & 15 & 14 & 13 & 12 & 11 & 10 & 9 & 8 & 7 & 6 & 5 & 4 & 3 & 2 & 1 & 0 & 1 & 2 & 3 & 4 & 5 & 6 & \cdots & 24 & 23 & 22 & 21 \\ 16 & 15 & 14 & 13 & 12 & 11 & 10 & 9 & 8 & 7 & 6 & 5 & 4 & 3 & 2 & 1 & 0 & 1 & 2 & 3 & 4 & 5 & 6 & 7 & 8 & 9 & 10 & \cdots & 20 & 19 & 18 & 17 \\ 12 & 11 & 10 & 9 & 8 & 7 & 6 & 5 & 4 & 3 & 2 & 1 & 0 & 1 & 2 & 3 & 4 & 5 & 6 & 7 & 8 & 9 & 10 & 11 & 12 & 13 & 14 & \cdots & 16 & 15 & 14 & 13 \\ 8 & 7 & 6 & 5 & 4 & 3 & 2 & 1 & 0 & 1 & 2 & 3 & 4 & 5 & 6 & 7 & 8 & 9 & 10 & 11 & 12 & 13 & 14 & 15 & 16 & 17 & 18 & \cdots & 12 & 11 & 10 & 9 \\ 4 & 3 & 2 & 1 & 0 & 1 & 2 & 3 & 4 & 5 & 6 & 7 & 8 & 9 & 10 & 11 & 12 & 13 & 14 & 15 & 16 & 17 & 18 & 19 & 20 & 21 & 22 & \cdots & 8 & 7 & 6 & 5 \end{bmatrix} \frac{2\pi}{48}$$

Referring to Equation 26, it can be confirmed that columns are circularly repeated. Each vector may be configured by arranging elements at regular intervals having each element in the vector $\phi''$ as a start point.

Since elements of a beamforming vector are generated using the elements of Equation 26, the beamforming vector may be configured by determining a start point in the elements of the TCV defined above according to the azimuth angle of a user and then selecting elements at regular intervals. Equation 27 represents an example of $\phi''$ when N is 48.

Through the above-described procedures, a beamforming vector for a uniform circular antenna array structure may be generated (or determined).

Next, a method of defining a codebook for a uniform circular antenna array structure will be described.

In the present description, it is assumed that a codebook is composed of $Q=2^B$ code vectors according to the number of feedback bits, B. Here, an index closest to (i.e., corresponding to) the azimuth angle of a UE may be defined as a center reference index k and an index interval between selected code vectors may be defined as q.

[Equation 27]

$$[0 \ 1 \ 2 \ 3 \ 4 \ 5 \ 6 \ 7 \ 8 \ 9 \ 10 \ 11 \ 12 \ 13 \ 14 \ 15 \ 16 \ 17 \ 18 \ 19 \ 20 \ 21 \ 22 \ 23 \ 24 \ 23 \ 22 \ \cdots \ 4 \ 3 \ 2 \ 1]^T \frac{2\pi}{48}$$

A beamforming ring may be defined by arranging phase information of a circular structure in a circular form using the characteristic of the vector that element values increase and then decrease as represented by Equation 27.

Figure 12:
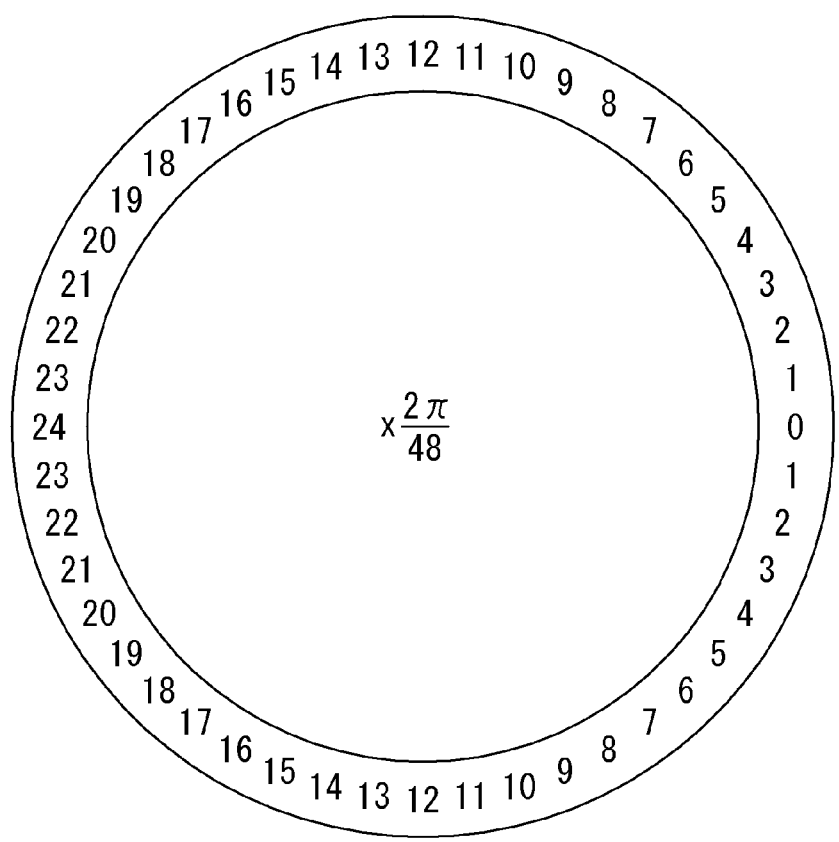
FIG. 12 illustrates an example of a beamforming ring to which the method proposed in the present description is applicable.

FIG. 12 illustrates an example of a beamforming ring to which the method proposed in the present description is applicable. FIG. 12 is for convenience of description and does not limit the scope of the present invention.

In addition, identically or similarly to the above-described case, a beamforming vector may be configured using a method of indexing elements according to the azimuth angle of a UE. A code vector may be configured (or realized) through indexing of elements constituting a TCV or a beamforming ring having a size of N. Such a code vector may be defined by Equation 28.

[Equation 28]

$$v_n = \frac{1}{\sqrt{M}} [v_{n,0} \ v_{n,1} \ v_{n,2} \ v_{n,3} \ \cdots \ v_{n,M-1}]^T$$

$$= \frac{1}{\sqrt{M}} [v'_n \ v'_{n+Q} \ v'_{n+2Q} \ v'_{n+3Q} \ \cdots \ v'_{n+(N-1)Q}]^T,$$

$$n = 0, 1, 2, \ldots, N-1$$

A left reference index p which refers to a starting code vector of the codebook may be defined using the center reference index and the index interval and represented by Equation 29.

[Equation 29]

$$k = N - \left[\frac{N}{2\pi}\Phi\right], \ p = k - \frac{Q}{2}q,$$

$[.]$ is round functioin

In Equation 29, k is the center reference index, q is the index interval between selected code vectors, Q represents $2^B$, N represents the increased length of the beamforming vector and $\phi$ represents the azimuth angle of the UE. Here, "round function" may refer to a rounding function.

A codebook W for a uniform circular antenna array may be defined using the above description as represented by Equation 30.

[Equation 30]

-continued $$W = \begin{bmatrix} v_p & v_{p+q} & v_{p+2q} & \cdots & v_{p+(Q-1)q} \end{bmatrix}$$

$$= \frac{1}{\sqrt{M}} \begin{bmatrix} v'_p & v'_{p+q} & v'_{p+2q} & \cdots & v'_{p+(Q-1)q} \\ v'_{p+O} & v'_{p+q+O} & v'_{p+2q+O} & \cdots & v'_{p+(Q-1)q+O} \\ v'_{p+2O} & v'_{p+q+2O} & v'_{p+2q+2O} & \cdots & v'_{p+(Q-1)q+2O} \\ \vdots & \vdots & \vdots & \ddots & \vdots \\ v'_{p+(M-1)O} & v'_{p+q+(M-1)O} & v'_{p+2q+(M-1)O} & \cdots & v'_{p+(Q-1)q+(M-1)O} \end{bmatrix}$$

Referring to Equation 30, each column of the defined matrix refers to a code vector and the length of the defined code vector may be adjusted. Due to the characteristics of the circular antenna array structure, only antenna elements arranged at a specific position may contribute to signal transmission with respect to a target UE. Accordingly, it may be desirable to perform beamforming using only some antenna elements.

In addition, the length of the code vector may be defined as L (equal to or less than M) and a length adjustment index for adjusting the code vector length may be defined as l in the present description. In this case, l may be determined differently for a case in which L is an odd number and a case in which L is an even number and may be represented by Equation 31.

$$l = \begin{cases} \left[\left(\frac{M}{2\pi}\right)\Phi\right] - \frac{L-1}{2}, & \text{if } L \text{ is odd} \\ \left[\left(\frac{M}{2\pi}\right)\Phi\right] - \frac{L}{2}, & \text{if } L \text{ is even} \end{cases} \quad \text{[Equation 31]}$$

In Equation 31, L indicates the length of the code vector, φ indicates the azimuth angle of a UE, and M represents the number of antenna elements constituting the uniform circular antenna array. In addition, [.] represents a round function and ⌈.⌉ represents a ceiling function.

Here, the code vector having the adjusted length may be represented by Equation 32.

[Equation 32]

$$v_n^{(L)} = \frac{1}{\sqrt{L}} \begin{bmatrix} v_{n,0}^{(L)} & v_{n,1}^{(L)} & v_{n,2}^{(L)} & \cdots & v_{n,M-1}^{(L)} \end{bmatrix}^T$$

$$= \frac{1}{\sqrt{L}} \begin{bmatrix} \cdots & 0 & v'_{n+lO} & v'_{n+(l+1)O} & \cdots & v'_{n+(l+L-1)O} & 0 & \cdots \end{bmatrix}^T,$$

$$n = 0, 1, \ldots, N-1$$

$$v_{n,m}^{(L)} = \begin{cases} v_{n,m} = v'_{n+mO}, & \text{if } l \le m \le l+L-1 \\ 0, & \text{otherwise} \end{cases}$$

In addition, beamforming may be more accurately performed by reflecting phase variation caused by zenith angle variation in the code vector. In the present description, it is assumed that a symbol Θ for representing a zenith angle is defined as 0° when beams from antenna elements propagate in parallel with the ground and as an angle having a negative value when the beams propagate in a direction opposite the ground (−90°≤Θ≤+90°).

The aforementioned propagation distance difference $d_m$ per antenna element may be modified into Equation 33 according to variation in Θ.

$$d_m^{(45°)} = R\cos\Theta - R\cos(\Phi - \Phi_m)\cos\Theta = d_m\cos\Theta,$$
$$m = 0, 1, \ldots, M-1 \quad \text{[Equation 33]}$$

Further, a phase difference occurring according to Equation 33 may be represented by Equation 34.

$$\theta'^{(\Theta)} = \theta'\cos\Theta \quad \text{[Equation 34]}$$

A TCV modified based on phase difference variation therein may be represented by Equation 35 based on Equation 34.

$$v'^{(\Theta)} = \exp(-j\theta'^{(\Theta)}) \quad \text{[Equation 35]}$$

In addition, a code vector $v_n^{(\Theta)}$ and a codebook $W^{(\Theta)}$ modified based on the aforementioned phase difference variation (i.e., Equation 34) may be respectively represented by Equations 36 and 37.

$$v_n^{(\Theta)} = \frac{1}{\sqrt{M}} \begin{bmatrix} v_n'^{(\Theta)} & v_{n+O}'^{(\Theta)} & v_{n+2O}'^{(\Theta)} & \cdots & v_{n+(M-1)O}'^{(\Theta)} \end{bmatrix}^T \quad \text{[Equation 36]}$$

$$W^{(\Theta)} = \begin{bmatrix} v_p^{(\Theta)} & v_{p+q}^{(\Theta)} & v_{p+2q}^{(\Theta)} & \cdots & v_{p+(Q-1)q}^{(\Theta)} \end{bmatrix} \quad \text{[Equation 37]}$$

Through the above-described procedures, a code vector and a codebook for a uniform circular antenna array structure may be defined.

Hereinafter, an example of a method of configuring a codebook for a uniform circular antenna array structure using the aforementioned beamforming ring will be described.

When a vector is configured using a beamforming ring, each beamforming vector may be represented using a specific position of the beamforming ring. The specific position refers to φ corresponding to the first element of the corresponding beamforming vector, and φ corresponding to the second and third elements are automatically located counterclockwise on the beamforming ring at the interval of an oversampling factor O.

Figure 13:
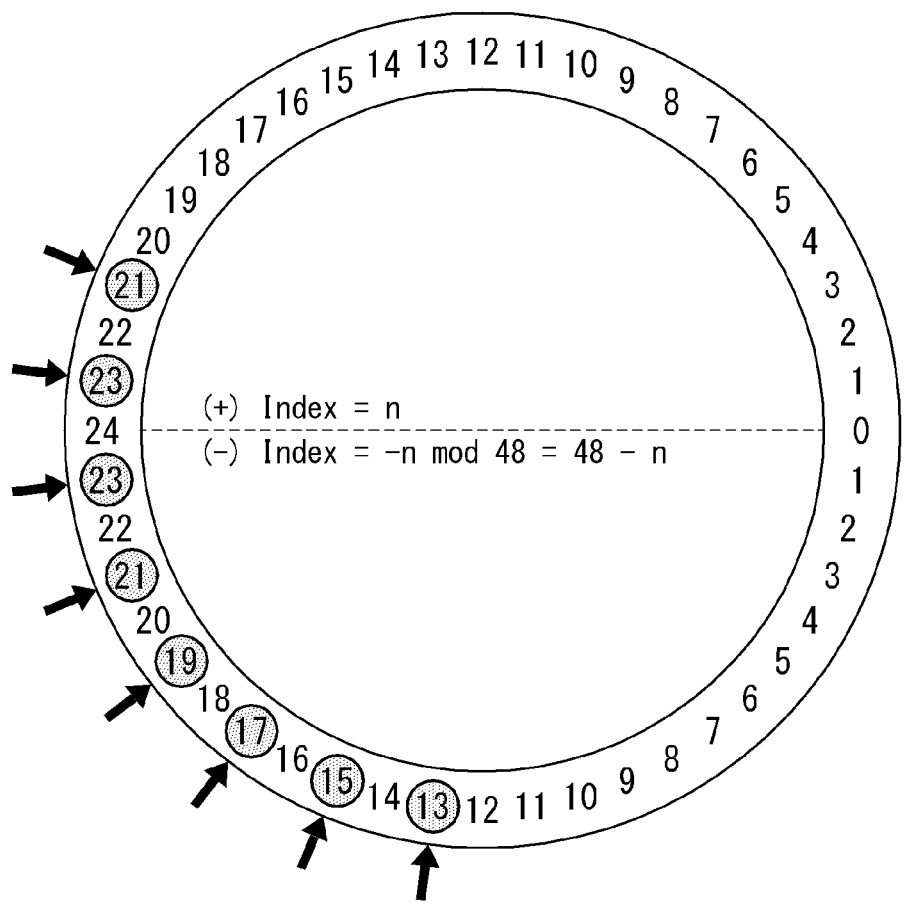
FIG. 13 illustrates an example of a codebook generation method to which the method proposed in the present description is applicable.

FIG. 13 illustrates an example of a codebook generation method to which the method proposed in the present description is applicable. FIG. 13 is for convenience of description and does not limit the scope of the present invention.

In FIG. 13, it is assumed that a codebook is generated with the number of feedback bits, B, set to 3 when the azimuth angle of a UE is 142.5°. When a line is drawn based on elements 0 and 24 of the beamforming ring, elements corresponding to the upper part may be set to positive indices and elements corresponding to the lower part may be set to negative indices.

As shown in FIG. 13, the center reference index k may be determined as 29 (k=N−[(N/2π)Φ]=29) according to the azimuth angle of the UE and p may be determined as 21 (p=k−(Q/2)q=21) when q is 2, for example.

Here, "29" refers to the counterclockwise twenty-ninth value based on 0 on the beamforming ring and corresponds to antenna element 19 located in the lower part (i.e., 48−29=19). Since a code vector is composed of elements separated by the oversampling factor O at regular intervals based on a start point, code vectors may be determined using the value φ obtained at intervals of O=4 based on start points indicated by arrows in FIG. 13 in the above example. That is, if k, q and p are determined according to the position of the UE and the codebook size, a codebook can be configured through indices on the beamforming ring.

An example of a codebook acquired through the beamforming ring may be represented by Equation 38.

[Equation 38]

$$W = [\, v_{21} \quad v_{23} \quad v_{25} \quad v_{27} \quad v_{29} \quad v_{31} \quad v_{33} \quad v_{35} \,]$$

$$= \frac{1}{\sqrt{12}} \begin{bmatrix} v'_{21} & v'_{23} & v'_{25} & v'_{27} & v'_{29} & v'_{31} & v'_{33} & v'_{35} \\ v'_{25} & v'_{27} & v'_{29} & v'_{31} & v'_{33} & v'_{35} & v'_{37} & v'_{39} \\ v'_{29} & v'_{31} & v'_{33} & v'_{35} & v'_{37} & v'_{39} & v'_{41} & v'_{43} \\ v'_{33} & v'_{35} & v'_{37} & v'_{39} & v'_{41} & v'_{43} & v'_{45} & v'_{47} \\ v'_{37} & v'_{39} & v'_{41} & v'_{43} & v'_{45} & v'_{47} & v'_{1} & v'_{3} \\ v'_{41} & v'_{43} & v'_{45} & v'_{47} & v'_{1} & v'_{3} & v'_{5} & v'_{7} \\ v'_{45} & v'_{47} & v'_{1} & v'_{3} & v'_{5} & v'_{7} & v'_{9} & v'_{11} \\ v'_{1} & v'_{3} & v'_{5} & v'_{7} & v'_{9} & v'_{11} & v'_{13} & v'_{15} \\ v'_{5} & v'_{7} & v'_{9} & v'_{11} & v'_{13} & v'_{15} & v'_{17} & v'_{19} \\ v'_{9} & v'_{11} & v'_{13} & v'_{15} & v'_{17} & v'_{19} & v'_{21} & v'_{23} \\ v'_{13} & v'_{15} & v'_{17} & v'_{19} & v'_{21} & v'_{23} & v'_{25} & v'_{27} \\ v'_{17} & v'_{19} & v'_{21} & v'_{23} & v'_{25} & v'_{27} & v'_{29} & v'_{31} \end{bmatrix}$$

In addition, beamforming length variation may be determined according to the azimuth angle of a UE. An azimuth angle which can be covered by each beamforming vector may be determined according to the aforementioned beamforming length (i.e., code vector length) L based on Equation 31. An example of a length-adjusted codebook may be represented by Equation 39.

[Equation 39]

$$W^{(5)} = [\, v_{21}^{(5)} \quad v_{23}^{(5)} \quad v_{25}^{(5)} \quad v_{27}^{(5)} \quad v_{29}^{(5)} \quad v_{31}^{(5)} \quad v_{33}^{(5)} \quad v_{35}^{(5)} \,]$$

$$= \frac{1}{\sqrt{5}} \begin{bmatrix} 0 & 0 & 0 & 0 & 0 & 0 & 0 & 0 \\ 0 & 0 & 0 & 0 & 0 & 0 & 0 & v'_{39} \\ 0 & 0 & 0 & 0 & 0 & v'_{39} & v'_{41} & v'_{43} \\ 0 & 0 & 0 & 0 & v'_{39} & v'_{41} & v'_{43} & v'_{45} & v'_{47} \\ 0 & v'_{39} & v'_{41} & v'_{43} & v'_{45} & v'_{47} & v'_{1} & v'_{3} \\ v'_{41} & v'_{43} & v'_{45} & v'_{47} & v'_{1} & v'_{3} & v'_{5} & v'_{7} \\ v'_{45} & v'_{47} & v'_{1} & v'_{3} & v'_{5} & v'_{7} & v'_{9} & 0 \\ v'_{1} & v'_{3} & v'_{5} & v'_{7} & v'_{9} & 0 & 0 & 0 \\ v'_{5} & v'_{7} & v'_{9} & 0 & 0 & 0 & 0 & 0 \\ v'_{9} & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

Hereinafter, evaluation of performance of a proposed codebook to which the above-described method is applied and performance of a conventional codebook will be described.

Here, an average correlation $\mu$ is used as a performance evaluation index and a case in which a correlation between a code vector $v_i$ and a channel row vector $\bar{h}$ having size normalized to 1 is $\bar{h}v_i$ is assumed. In addition, the average correlation $\mu$ may refer to a value obtained by averaging correlations with respect to a corresponding channel when a code vector having highest correlation among code vectors in a codebook is selected for a plurality of randomly generated channels. For example, the average correlation may be represented by Equation 40.

[Equation 40]

$$\mu = E\left[\max_{0 \leq i < Q} |\bar{h}v_i|^2\right]$$

In the present description, it is assumed that the average of channel powers is normalized to the same value for performance comparison. In addition, it is assumed that the center frequency $f_c$ for signal transmission is 2 GHz and the wavelength $\lambda$ thereof is 0.15 m. Further, it is assumed that the number M of antenna elements for signal transmission is 12 and the radius R which satisfies a distance $\lambda/2$ between neighboring antennas is 0.145 m. Here, a 3D spatial channel model (SCM) environment which considers the vertical position of a UE as well as the horizontal distance of the UE for channel generation may be applied.

For code vector generation, the length of a TCV may be preferentially determined. Here, the length N of the TCV may be determined by the number M of antenna elements and the oversampling factor O, as described above. To check the performance of a beamforming vector according to the oversampling factor O, correlations between N generated beamforming vectors and a channel can be compared.

Figure 14:
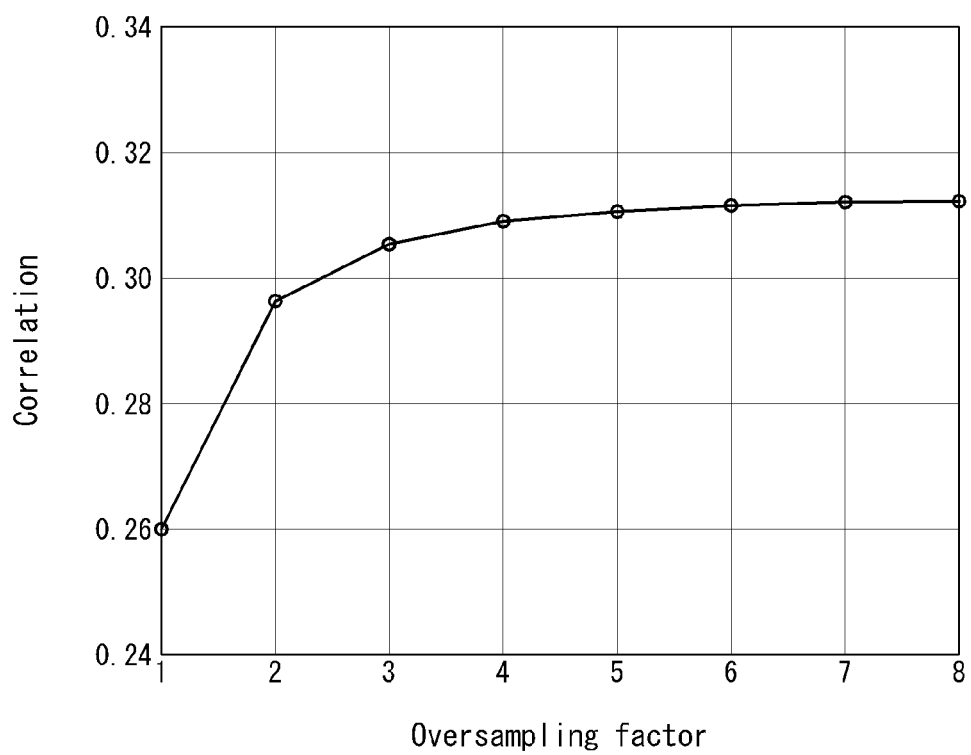
FIG. 14 illustrates an example of codebook correlation performance according to increase in an oversampling factor.

FIG. 14 illustrates an example of a codebook correlation according to oversampling factor increase. FIG. 14 is for convenience of description and does not limit the scope of the present invention.

Referring to FIG. 14, an additional performance gain of 1.2% is obtained when the oversampling factor increases from 3 to 4 and an additional performance gain of 0.5% is obtained when the oversampling factor increases from 4 to 5. Additional performance gain beyond the oversampling factor of 5 is insignificant and thus it may be desirable to set the oversampling factor to 4.

In addition, to optimize the beam spacing q which is a parameter for codebook configuration, codebooks are generated by increasing the value q for the number of feedback bits and performances of the generated codebooks may be compared to check an optimal value of q.

Figure 15:
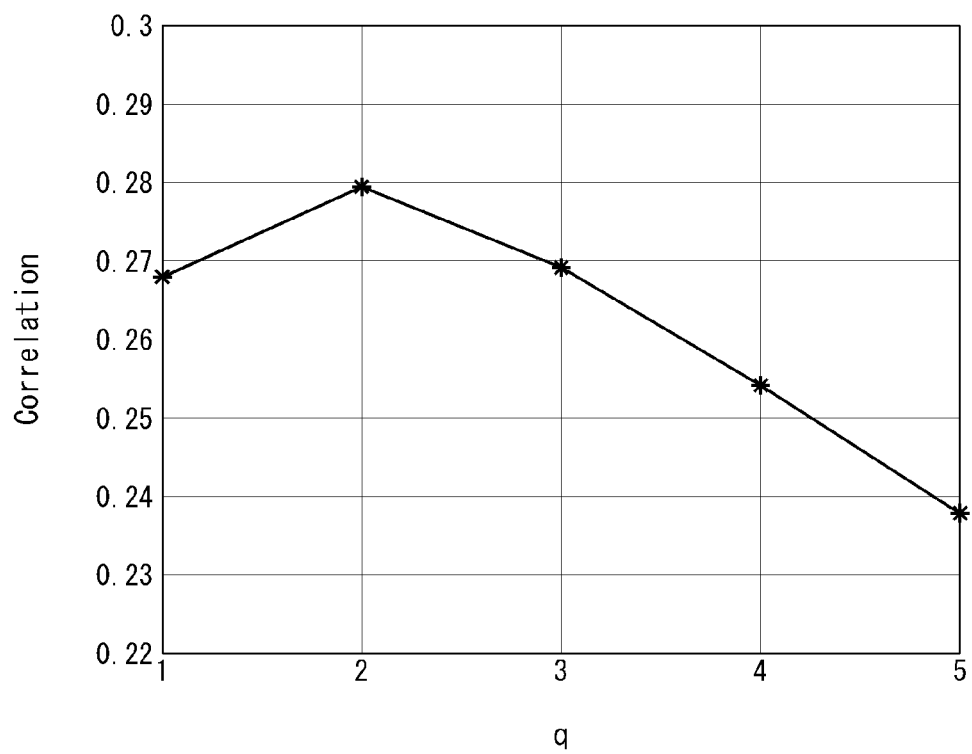
FIG. 15 illustrates an example of codebook correlation performance according to beam spacing.

FIG. 15 illustrates an example of a codebook correlation according to beam spacing. FIG. 15 is for convenience of description and does not limit the scope of the present invention.

Referring to FIG. 15, a case in which the number of feedback bits, B, is set to 3 is assumed. That is, the graph of FIG. 15 shows the performance according to q when the number of feedback bits is 3. It can be known from the graph of FIG. 15 that it is desirable to set the value 1 to 2 when the number of feedback bits is 3. In a similar manner, it may be confirmed that an optimal value of q is 2 when the number of feedback bits is 2 and an optimal value of 1 is 1 when the number of feedback bits is equal to or greater than 4.

A DFT codebook is used as a comparison target for the codebook proposed in the present description and detailed set values will be described below in the section in which discrimination from conventional codebooks is described.

For performance evaluation, it is assumed that UEs are arranged at intervals of 15°, experiments considering a zenith angle are excluded and distances between a base station and the UEs are randomly set. In addition, 3,000 channels are generated per azimuth and the number of feedback bits for codebook configuration is 3 (i.e., $2^3=8$ is used as the value Q).

The codebook proposed in the present description and the DFT codebook may be configured by selecting 8 (i.e., Q=8) from 48 code vectors. The parameter p for codebook configuration depends on UE azimuth angle, and q is set to 2 in the case of the proposed codebook and set to 4 in the case of the DFT codebook.

Performance evaluation results obtained in the above-described environment (or condition) are shown in FIGS. 16 to 19.

Figure 16:
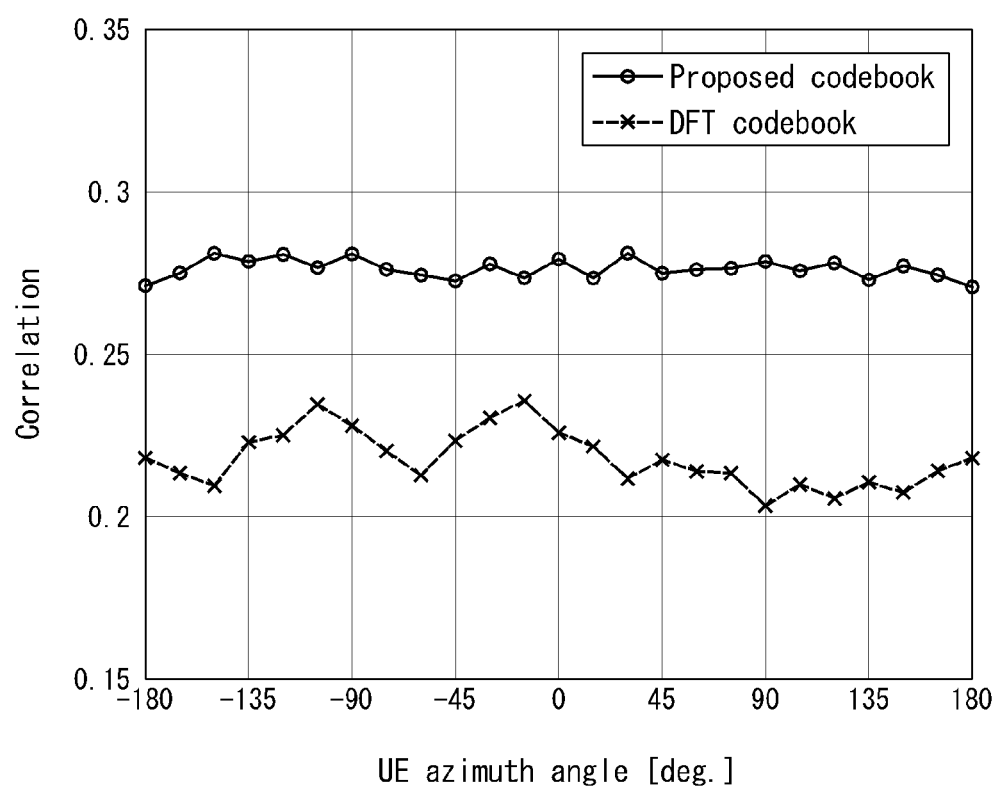
FIG. 16 illustrates an example of average correlation performance according to UE azimuth angle.

FIG. 16 shows an example of average correlations according to UE azimuth angle. Here, it can be confirmed that the correlation value of the codebook proposed in the present description is greater than that of the conventional codebook.

Figure 17:
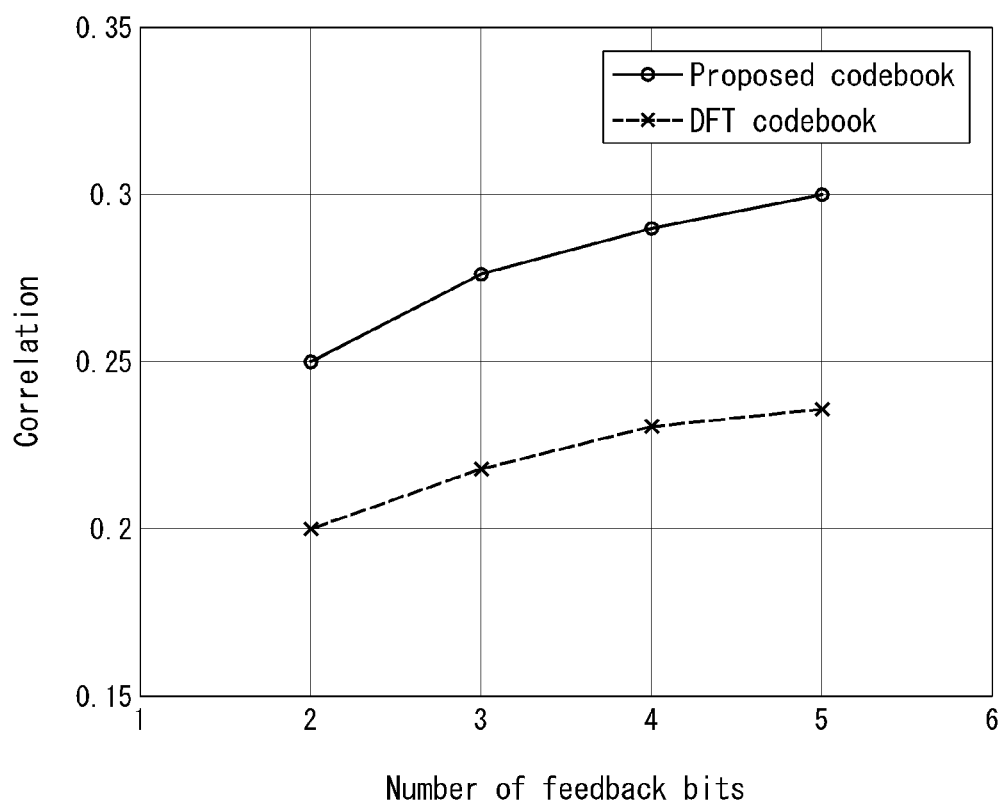
FIG. 17 illustrates a result obtained by calculating average correlation performance as illustrated in FIG. 16 while varying the number B of feedback bits from 2 to 5 and averaging the calculation results.

FIG. 17 shows results obtained by calculating average correlations as shown in FIG. 16 while changing the number of feedback bits, B, from 2 to 5 and averaging the average correlations. FIG. 17 shows results with respect to the conventional codebook (i.e., DFT codebook) and the codebook proposed in the present description. Here, it can be confirmed that the correlation value of the codebook proposed in the present description is greater than that of the conventional codebook. In addition, it can be confirmed that the correlation values increase as the number of feedback bits increases.

Figure 18:
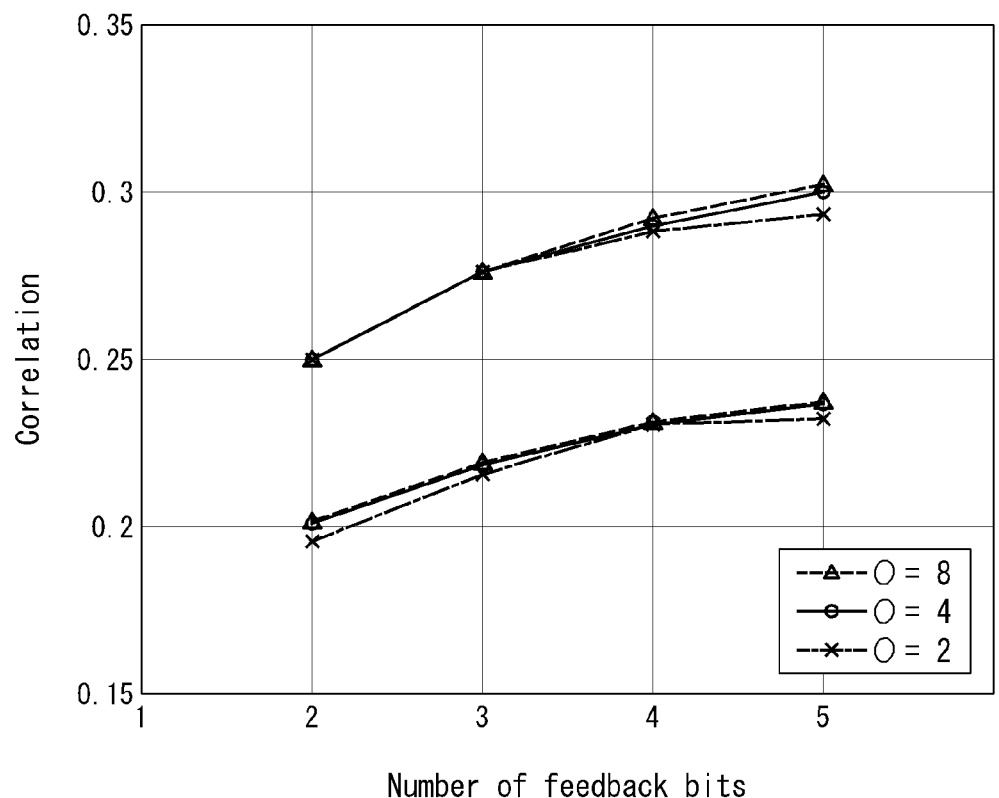
FIG. 18 illustrates an example of average correlation performance based on a codebook designed in accordance with the number of feedback bits for a case in which an oversampling factor is differently set.

FIG. 18 shows an example of average correlations based on a codebook designed in accordance with the number of feedback bits for different oversampling factors. Referring to FIG. 18, average correlations for oversampling factors 2, 4 and 8 can be compared. It can be confirmed that the correlation value of the codebook proposed in the present description is greater than that of the conventional codebook. In addition, it can be confirmed that the correlation values increase as the number of feedback bits increases.

For example, in the case of performance evaluation with respect to variation in a beamforming formula according to zenith angle, UEs may be arranged at intervals of 10 m from 0 m to 50 m in the case of UE azimuth angle of 0° to generate about 3,000 channels at each position. Here, a codebook size Q for performance evaluation may be set to 8.

Figure 19:
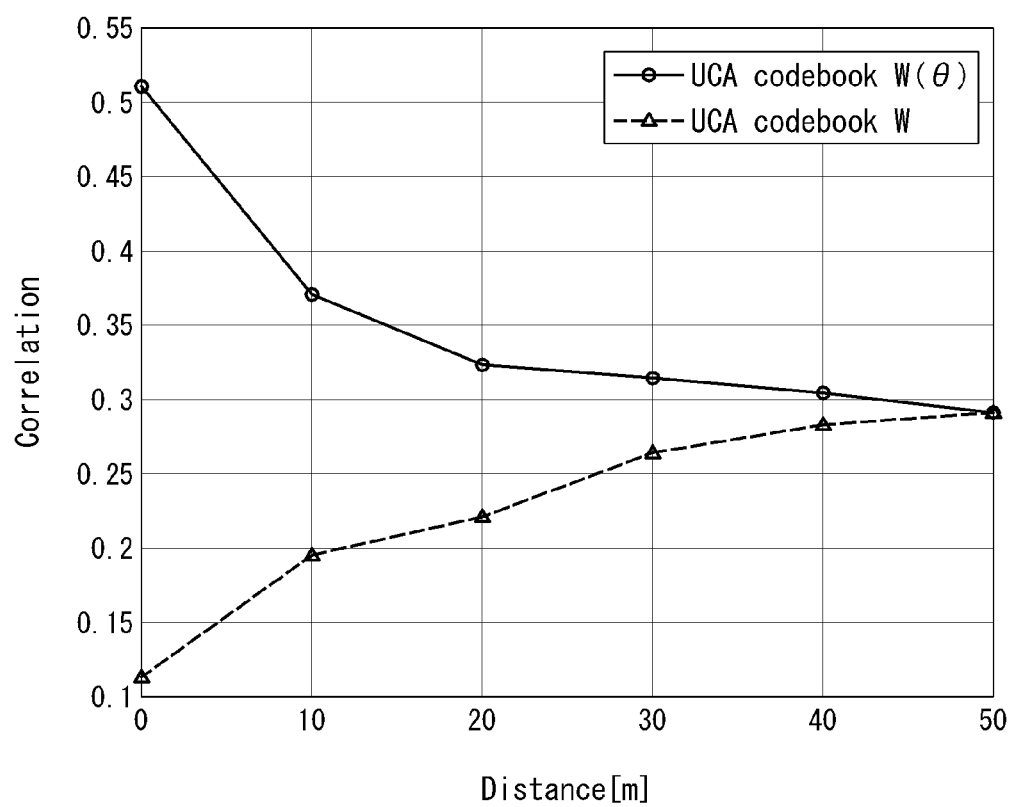
FIG. 19 illustrates an example of correlation performance of a proposed codebook and a modified proposed codebook according to a distance between a base station and a UE.

FIG. 19 shows an example of correlations of the proposed codebook and a modified proposed codebook according to distances between a base station and UEs. Referring to FIG. 19, it can be confirmed that a UE closer to the base station has a larger performance gain of the modified formula (e.g., the codebook represented by Equation 37) from experimental results.

Hereinafter, discrimination between the codebook proposed in the present description and a conventional codebook will be described in detail. In the present description, a method of determining a long-term DFT codebook by selecting, through searching, a start index p and a beam spacing q which indicate the highest performance per UE location in a 12×48 DFT matrix D is used with respect to a DFT codebook used as a performance comparison target.

For example, the element of an m-th row and an n-th column of the matrix D may be represented by Equation 41.

$$d_{m,n} = \frac{1}{\sqrt{12}} \exp\left(j\frac{2\pi nm}{48}\right), \quad m = 0, 1, 2, \ldots, 11,$$
$$n = 0, 1, 2, \ldots, 47$$
[Equation 41]

In addition, the matrix D may be represented by Equation 42.

$$D = \frac{1}{\sqrt{12}} \begin{bmatrix} 1 & 1 & 1 & \ldots & 1 \\ 1 & e^{j2\pi/48} & e^{j4\pi/48} & \ldots & e^{j2\cdot47\pi/48} \\ 1 & e^{j4\pi/48} & e^{j8\pi/48} & \ldots & e^{j2\cdot2\cdot47\pi/48} \\ \vdots & \vdots & \vdots & \ddots & \vdots \\ 1 & e^{j22\pi/48} & e^{j44\pi/48} & \ldots & e^{j2\cdot11\cdot47\pi/48} \end{bmatrix}$$
[Equation 42]

Here, an n-th column vector of the matrix D may be defined as $w_n$. In this case, the DFT codebook may be selected as represented by Equation 43 from the result of searching for the start index p and the beam spacing q.

$$W_{DFT} = [w_p w_{p+q} w_{p+2q} \cdots w_{p+(Q-1)q}]$$
[Equation 43]

For example, when the number of feedback bits, B, is 3, the value of the beam spacing q may be selected as 4 through searching and the value of p may vary according to UE azimuth angle.

Here, phase differences in the code vectors may be identical in the case of the DFT codebook. This means that propagation distance differences for antenna elements are identical and may mean that characteristics of the uniform antenna array are not sufficiently reflected.

It can be confirmed that the codebook proposed in the present description in which geometrical structure characteristics are reflected has higher performance than the conventional codebook (e.g., DFT codebook) through the above-described performance evaluation results.

Hereinafter, operation methods and utilization methods associated with the above-described methods will be described in detail.

First, to perform selection of a code vector and/or beamforming, a base station may transmit a reference signal (e.g., a downlink reference signal). Here, a UE may measure reception power per antenna port using the reference signal transmitted from the base station and then transmit (or forward) the measurement result to the base station through uplink.

Then, the base station may estimate the azimuth angle of the UE based on the reception power measurement value per antenna port and determine a long-term codebook including a parameter (e.g., p) with respect to a start index and a parameter (e.g., q) with respect to a beam spacing through the azimuth angle of the UE.

Here, the base station may request PMI selection of the UE based on the determined long-term codebook. In this case, the UE may determine a short-term code vector according to instantaneous channel variation and then report the short-term code vector to the base station.

After the above-described procedure is performed, the base station may perform beamforming specialized for a uniform circular antenna array.

It is assumed that a UE performs long-term CSI feedback and/or wideband CSI feedback. In this case, the UE may be configured or instructed to perform beam group reporting in the form of Equation 38 (and/or in the form of a ring vector through the aforementioned TCV). Alternatively, the UE may be (optionally) configured or instructed to group only some beam directions in accordance with a specifically set (or indicated) parameter value such as the beamforming length L in the form of a beam group and feeding back the beam group when performing beam group reporting in the form of Equation 39 (and/or in the form of a ring vector through the aforementioned TCV).

Additionally, the UE may be configured to perform short-term CSI feedback and/or subband CSI feedback for indicating which final beam in the corresponding specific beam group will be applied subsequently to the above-described long-term CSI feedback and/or long-term wideband CSI feedback. Such short-term CSI feedback and/or subband CSI feedback may include beam selection, phase correction (e.g., co-phasing) and/or CQI reporting.

Figure 20:
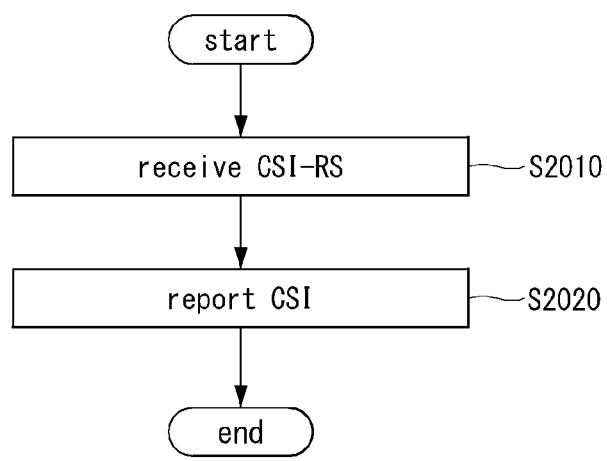
FIG. 20 is a flowchart illustrating a codebook based signal transmission/reception method of a UE according to an embodiment of the present invention.

FIG. 20 is a flowchart illustrating a codebook based signal transmission/reception method of a UE according to an embodiment of the present invention. With respect to this flowchart, the above description and methods may be applied in an identical or similar manner and redundant description will be omitted.

A UE may receive a CSI-RS from a base station through multiple antenna ports (S2010).

Then, the UE may report channel state information to the base station (S2020).

Here, the channel state information may include a precoding matrix index (PMI) for indicating a specific code vector among a plurality of code vectors included in a codebook. In addition, elements included in each code vector included in the codebook may be selected from elements of a predetermined circular vector (e.g., a beamforming-ring vector as shown in FIGS. 12 and 13) using the azimuth angle (e.g., $\Phi$) of the UE with respect to the base station and an oversampling factor (e.g., O).

Further, the predetermined circular vector may be generated based on a vector with respect to a difference between the azimuth angle of the UE with respect to the base station and the azimuth angle of each antenna element. Here, the length of the predetermined circular vector may be determined by a product of the number of antenna elements for signal transmission and reception and the oversampling factor. In addition, the elements of the predetermined circular vector may be configured by circulating values from 0 to a value corresponding to half the length of the predetermined circular vector.

Further, the first index (e.g., p) of the starting code vector of the codebook may be determined based on a specific index (e.g., k) of an element corresponding to the azimuth angle of the UE with respect to the base station among the elements of the predetermined circular vector, an index spacing (e.g., q) between code vectors and the number (e.g., Q) of code vectors included in the codebook.

Further, when the UE is instructed by the base station to report channel state information about a specific number of beams, elements other than the specific number of elements in each code vector included in the codebook may be set to 0.

Apparatus to which the Present Invention May be Applied

Figure 21:
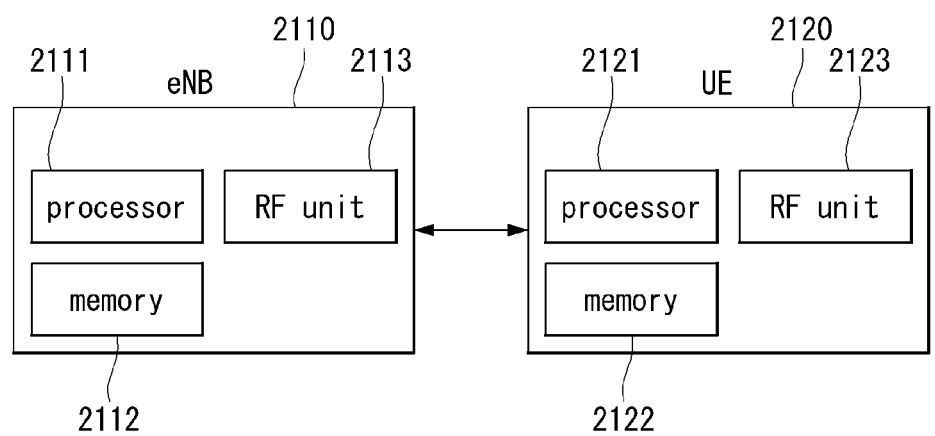
FIG. 21 is a block diagram of a wireless communication apparatus according to an embodiment of the present invention.

FIG. 21 illustrates a block diagram of a wireless communication apparatus according to an embodiment of the present invention.

Referring to FIG. 21, a wireless communication system includes a base station 2110 and a plurality of UEs 2120 located within the region of the base station 2110.

The base station 2110 includes a processor 2111, a memory 2112, and a Radio Frequency (RF) unit 2113. The processor 2111 implements the functions, processes, and/or methods proposed in FIGS. 1 to 20. The layers of the wireless interface protocol may be implemented by the processor 2111. The memory 2112 is connected to the processor 2111, and stores various kinds of information for driving the processor 2111. The RF unit 2113 is connected to the processor 2111 to transmit and/or receive a radio signal.

A UE 2120 includes a processor 2121, a memory 2122, and an RF unit 2123. The processor 2121 implements the functions, processes, and/or methods proposed in FIGS. 1 to 20. The layers of the wireless interface protocol may be implemented by the processor 2121. The memory 2122 is connected to the processor 2121, and stores various kinds of information for driving the processor 2121. The RF unit 2123 is connected to the processor 2121 to transmit and/or receive a radio signal.

The memories 2112 and 2122 may be internal or external to the processors 2111 and 2121, and may be connected to the processors 2111 and 2121 by various well-known methods. Also, the base station 2110 and/or the UE 2120 may have a single antenna or multiple antennas.

The embodiments described above are those in which the components and features of the present invention are combined in a predetermined form. Each component or feature should be considered as being optional unless otherwise expressly stated. Each component or feature may be embodied while being not combined with any other component or feature. It is also possible to configure some embodiments of the present invention by combining some of the components and/or features. The order of the operations described in the embodiments of the present invention may be changed. Some configurations or features of any embodiment may be included in other embodiments, or may be replaced with corresponding configurations or features of other embodiments. It will be obvious that the claims which do not have an explicit citation in the claims can be combined to form an embodiment or a new claim can be included by amendment after the application.

Embodiments according to the present invention may be implemented by various means, for example, hardware, firmware, software, or a combination thereof. In the case of implementation by hardware, an embodiment of the present invention may include one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, a microprocessors, and the like.

In the case of an implementation by firmware or software, an embodiment of the present invention may be implemented in the form of a module, a procedure, a function, or the like for performing the functions or operations described above. The software code may be stored in a memory and driven by a processor. The memory is located inside or outside the processor, and may exchange data with the processor by various well-known means.

It will be apparent to those skilled in the art that the present invention can be embodied in other specific forms without departing from the essential characteristics of the present invention. Accordingly, the foregoing detailed description should not be interpreted as restrictive in all aspects, and should be considered as illustrative. The scope of the present invention should be determined by rational interpretation of the appended claims, and all changes within the equivalent scope of the present invention are included in the scope of the present invention.

Various embodiments for carrying out the invention have been described in the best mode for carrying out the invention.

Although the present invention has been described with reference to examples applied to the 3GPP LTE/LTE-A system, it can be applied to various wireless communication systems other than the 3GPP LTE/LTE-A system.

According to an embodiment of the present invention, it is possible to generate a beamforming vector suitable for a uniform circular antenna array and define a codebook to perform accurate beamforming specialized for the corresponding shape. In addition, it is possible to solve problems generated in the 3-sector structure such as performance deterioration near a sector boundary through omnidirectional transmission.

In addition, according to an embodiment of the present invention, the proposed codebook is designed using circular repetition in uniform circular arrangement based on the geometrical structure of the antenna array, and thus an accurate beamforming vector in accordance with the location of a user can be generated. Furthermore, more efficient beamforming can be performed by varying the beamforming vector length and correcting vector elements in consideration of a zenith angle.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

What is claimed is:

1. A method for transmitting and receiving signals based on a codebook, by an User Equipment (UE), in a multi-antenna wireless communication system, the method comprising:
receiving, from a base station (BS), a channel state information reference signal (CSI-RS) through multiple antenna ports; and
reporting, to the BS, channel state information,
wherein the channel state information includes a precoding matrix indicator (PMI) for indicating a specific code vector among a plurality of code vectors included in the codebook,
wherein elements of each code vector included in the codebook are selected from elements of a predetermined circular vector, using an azimuth angle of the UE for the BS and an oversampling factor, and
wherein the predetermined circular vector is generated based on a vector for a difference between the azimuth angle of the UE for the BS and an azimuth angle of each antenna element.

2. The method of claim 1, wherein a length of the predetermined circular vector is determined by a product of the number of antenna elements for transmission and reception of the signal and the oversampling factor.

3. The method of claim 2, wherein the elements of the predetermined circular vector are configured by circulating values from 0 to a value corresponding to half of the length of the predetermined circular vector.

4. The method of claim 2, wherein the first index of the starting code vector of the codebook is determined based on a specific index of an element corresponding to the azimuth angle of the UE for the base station among the elements of the predetermined circular vector, an index spacing between code vectors and the number of code vectors included in the codebook.

5. The method of claim 4, wherein the specific index is determined by the following equation 1:

$$k = N - \left[\frac{N}{2\pi}\Phi\right]$$ [Equation 1]

wherein N represents the length of the predetermined circular vector, [.] represents a round function and $\Phi$ represents the azimuth angle of the UE with respect to the base station.

6. The method of claim 5, wherein the codebook is defined by the following equation 2:

[Equation 2]

$$W = [v_p \quad v_{p+q} \quad v_{p+2q} \quad \cdots \quad v_{p+(Q-1)q}]$$

$$= \frac{1}{\sqrt{M}} \begin{bmatrix} v'_p & v'_{p+q} & v'_{p+2q} & \cdots & v'_{p+(Q-1)q} \\ v'_{p+O} & v'_{p+q+O} & v'_{p+2q+O} & \cdots & v'_{p+(Q-1)q+O} \\ v'_{p+2O} & v'_{p+q+2O} & v'_{p+2q+2O} & \cdots & v'_{p+(Q-1)q+2O} \\ \vdots & \vdots & \vdots & \ddots & \vdots \\ v'_{p+(M-1)O} & v'_{p+q+(M-1)O} & v'_{p+2q+(M-1)O} & \cdots & v'_{p+(Q-1)q+(M-1)O} \end{bmatrix}$$

wherein W represents the codebook, p represents the specific index, q represents the index spacing between code vectors, Q represents the number of code vectors included in the codebook, O represents the oversampling factor and M represents the number of antenna elements.

7. The method of claim 2, wherein, when the UE is instructed by the BS to report channel state information for a specific number of beams, elements other than the specific number of elements are set to 0 in each code vector.

8. A User Equipment (UE) transmitting channel station information (CSI) in a wireless communication system, comprising:
a radio frequency (RF) unit for transmitting and receiving radio signals; and
a processor for controlling the RF unit,
wherein the processor is configured to:
receive, from a base station (BS), a channel state information reference signal (CSI-RS) through multiple antenna ports; and
report, to the BS, channel state information,
wherein the channel state information includes a precoding matrix indicator (PMI) for indicating a specific code vector among a plurality of code vectors included in the codebook,
wherein elements of in each code vector included in the codebook are selected from elements of a predetermined circular vector using an azimuth angle of the UE for the base station and an oversampling factor, and
wherein the predetermined circular vector is generated based on a vector for a difference between the azimuth angle of the UE for the BS and an azimuth angle of each antenna element.

9. The UE of claim 8, wherein a length of the predetermined circular vector is determined by a product of the number of antenna elements for transmission and reception of the signal and the oversampling factor.

10. The UE of claim 9, wherein the elements of the predetermined circular vector are configured by circulating values from 0 to a value corresponding to half of the length of the predetermined circular vector.

11. The UE of claim 9, wherein the first index of the starting code vector of the codebook is determined based on a specific index of an element corresponding to the azimuth angle of the UE for the base station among the elements of the predetermined circular vector, an index spacing between code vectors and the number of code vectors included in the codebook.

12. The UE of claim 9, wherein, when the UE is instructed by the BS to report channel state information for a specific number of beams, elements other than the specific number of elements are set to 0 in each code vector.

\* \* \* \* \*